United States Patent
Matas et al.

(10) Patent No.: US 9,547,627 B2
(45) Date of Patent: Jan. 17, 2017

(54) COMMENT PRESENTATION

(71) Applicants: Michael Matas, San Francisco, CA (US); William Joseph Flynn, III, San Francisco, CA (US)

(72) Inventors: Michael Matas, San Francisco, CA (US); William Joseph Flynn, III, San Francisco, CA (US)

(73) Assignee: Facebook, Inc., Menlo Park, CA (US)

( * ) Notice: Subject to any disclaimer, the term of this patent is extended or adjusted under 35 U.S.C. 154(b) by 462 days.

(21) Appl. No.: 13/677,247

(22) Filed: Nov. 14, 2012

(65) Prior Publication Data

US 2014/0136968 A1    May 15, 2014

(51) Int. Cl.
  *G06F 17/21* (2006.01)
  *G06Q 50/00* (2012.01)

(52) U.S. Cl.
  CPC ........... *G06F 17/214* (2013.01); *G06F 17/211* (2013.01); *G06Q 50/01* (2013.01)

(58) Field of Classification Search
  None
  See application file for complete search history.

(56) References Cited

U.S. PATENT DOCUMENTS

| 5,422,993 A | 6/1995 | Fleming |
| 5,430,494 A | 7/1995 | Saeger |
| 5,668,966 A | 9/1997 | Ono |
| 5,692,175 A | 11/1997 | Davies |
| 5,941,626 A | 8/1999 | Yamuro |
| 6,141,018 A | 10/2000 | Beri |
| 6,188,432 B1 | 2/2001 | Ejima |
| 6,252,594 B1 | 6/2001 | Xia |
| 6,845,488 B1 * | 1/2005 | Shim ............... G06F 17/211 345/471 |
| 7,109,975 B2 | 9/2006 | Fedorak |
| 7,415,662 B2 | 8/2008 | Rothmuller |
| 7,479,949 B2 | 1/2009 | Jobs |
| 7,555,725 B2 | 6/2009 | Abramson |

(Continued)

FOREIGN PATENT DOCUMENTS

| EP | 2487603 | 8/2012 |
| EP | 2 518 646 | 10/2012 |

(Continued)

OTHER PUBLICATIONS

International Search Report and Written Opinion for International Application No. PCT/US2013/068303.

(Continued)

*Primary Examiner* — Maryam Ipakchi
(74) *Attorney, Agent, or Firm* — Baker Botts L.L.P.

(57) ABSTRACT

In one embodiment, a method includes displaying a content item on a screen of a computing device; displaying a first portion of a series of comments concerning the content item in close proximity to the content item on the screen of the computing device; and in response to a user scrolling down the series of comments, adjusting the content item so that the content item occupies less space on the screen of the computing device and there is more space available on the screen of the computing device for displaying the series of comments; and displaying a second portion of the series of comments using the more space, the second portion including more comments than the first portion.

15 Claims, 12 Drawing Sheets

(56) References Cited

U.S. PATENT DOCUMENTS

| | | |
|---|---|---|
| 7,590,947 B1 | 9/2009 | Gay |
| 7,930,646 B2 | 4/2011 | De Souza |
| 7,945,852 B1 | 5/2011 | Pilskalns |
| 8,051,089 B2 | 11/2011 | Gargi |
| 8,131,118 B1 | 3/2012 | Jing |
| 8,176,438 B2 | 5/2012 | Zaman |
| 8,271,907 B2 | 9/2012 | Kim |
| 8,275,394 B2 | 9/2012 | Mattila |
| 8,287,383 B1 | 10/2012 | Etter |
| 8,327,284 B2 | 12/2012 | Marusich |
| 8,327,289 B2 | 12/2012 | Butlin |
| 8,386,935 B2 | 2/2013 | van Zwol |
| 8,429,565 B2 | 4/2013 | Agarawala |
| 8,442,265 B1 | 5/2013 | Bosworth |
| 8,456,488 B2 | 6/2013 | Ubillos |
| 8,464,176 B2 | 6/2013 | Van Dok |
| 8,504,586 B2 | 8/2013 | Armstrong |
| 8,540,570 B2 | 9/2013 | Janis |
| 8,584,015 B2 | 11/2013 | Osten |
| 8,584,027 B2 | 11/2013 | Quennesson |
| 8,621,450 B2 | 12/2013 | Firman |
| 8,667,418 B2 | 3/2014 | Chaudhri |
| 8,677,283 B2 | 3/2014 | Fong |
| 8,683,377 B2 * | 3/2014 | Zuverink et al. ............. 715/784 |
| 8,683,378 B2 | 3/2014 | Bull |
| 8,726,142 B2 | 5/2014 | Piantino |
| 8,745,511 B2 | 6/2014 | Ducharme |
| 8,749,610 B1 | 6/2014 | Gossweiler |
| 8,799,818 B2 | 8/2014 | Kim |
| 8,803,908 B2 | 8/2014 | Van Osten |
| 8,811,771 B2 | 8/2014 | Shechtman |
| 8,830,270 B2 | 9/2014 | Zaman |
| 8,832,188 B1 | 9/2014 | Cierniak |
| 8,843,519 B2 | 9/2014 | Armstrong |
| 8,845,423 B1 | 9/2014 | Monahan |
| 8,892,997 B2 | 11/2014 | Louch |
| 8,898,562 B2 | 11/2014 | Tocchini |
| 8,922,575 B2 | 12/2014 | Garside |
| 8,938,690 B1 | 1/2015 | Khouri |
| 9,047,644 B1 | 6/2015 | Terleski |
| 9,081,410 B2 | 7/2015 | Matas |
| 2002/0145620 A1 | 10/2002 | Smith |
| 2003/0233650 A1 | 12/2003 | Zaner |
| 2004/0095400 A1 | 5/2004 | Anderson |
| 2004/0145593 A1 | 7/2004 | Berkner |
| 2004/0164969 A1 | 8/2004 | Matsuda |
| 2004/0218910 A1 | 11/2004 | Chang |
| 2004/0252120 A1 | 12/2004 | Hunleth |
| 2005/0091596 A1 | 4/2005 | Anthony |
| 2005/0210410 A1 | 9/2005 | Ohwa |
| 2005/0246283 A1* | 11/2005 | Gwiazda ................ G06Q 10/10 705/52 |
| 2005/0275636 A1 | 12/2005 | Dehlin |
| 2006/0010382 A1 | 1/2006 | Ejiri |
| 2006/0080621 A1 | 4/2006 | Park |
| 2006/0095331 A1 | 5/2006 | O'Malley |
| 2006/0161868 A1 | 7/2006 | Van Dok |
| 2007/0038846 A1 | 2/2007 | Kadambi |
| 2007/0061488 A1 | 3/2007 | Alagappan |
| 2007/0150913 A1 | 6/2007 | Ando |
| 2007/0236475 A1 | 10/2007 | Wherry |
| 2007/0236477 A1 | 10/2007 | Ryu |
| 2008/0009325 A1 | 1/2008 | Zinn |
| 2008/0034381 A1 | 2/2008 | Jalon |
| 2008/0057926 A1 | 3/2008 | Forstall |
| 2008/0064438 A1 | 3/2008 | Calvet |
| 2008/0098316 A1 | 4/2008 | Declan |
| 2008/0133526 A1 | 6/2008 | Haitani |
| 2008/0165153 A1 | 7/2008 | Platzer |
| 2008/0168349 A1 | 7/2008 | Lamiraux |
| 2008/0168384 A1 | 7/2008 | Platzer |
| 2008/0168402 A1 | 7/2008 | Blumenberg |
| 2008/0270886 A1 | 10/2008 | Gossweiler |
| 2008/0276269 A1 | 11/2008 | Miller |
| 2008/0282202 A1 | 11/2008 | Sunday |
| 2008/0294663 A1 | 11/2008 | Heinley |
| 2008/0307360 A1 | 12/2008 | Chaudhri |
| 2009/0007017 A1 | 1/2009 | Anzures |
| 2009/0031232 A1 | 1/2009 | Brezina |
| 2009/0044133 A1 | 2/2009 | Goto |
| 2009/0063947 A1* | 3/2009 | Anderson .......... G06Q 10/0631 715/212 |
| 2009/0063995 A1 | 3/2009 | Baron |
| 2009/0064031 A1 | 3/2009 | Bull |
| 2009/0064055 A1 | 3/2009 | Chaudhri |
| 2009/0106687 A1 | 4/2009 | De Souza |
| 2009/0132921 A1 | 5/2009 | Hwangbo |
| 2009/0132933 A1 | 5/2009 | Faski |
| 2009/0144392 A1 | 6/2009 | Wang |
| 2009/0164602 A1 | 6/2009 | Kies |
| 2009/0196510 A1 | 8/2009 | Gokturk |
| 2009/0198359 A1 | 8/2009 | Chaudhri |
| 2009/0199082 A1* | 8/2009 | Hollander et al. ............ 715/230 |
| 2009/0228807 A1 | 9/2009 | Lemay |
| 2009/0231271 A1 | 9/2009 | Heubel |
| 2009/0281988 A1 | 11/2009 | Yoo |
| 2009/0305732 A1 | 12/2009 | Marcellino |
| 2009/0307623 A1 | 12/2009 | Agarawala |
| 2009/0312033 A1 | 12/2009 | Shen |
| 2009/0325607 A1 | 12/2009 | Conway |
| 2010/0049534 A1 | 2/2010 | Whitnah |
| 2010/0058226 A1* | 3/2010 | Flake et al. ................... 715/786 |
| 2010/0058240 A1 | 3/2010 | Bull |
| 2010/0070628 A1 | 3/2010 | Harrang |
| 2010/0095239 A1* | 4/2010 | McCommons ...... G11B 27/036 715/784 |
| 2010/0158315 A1 | 6/2010 | Martin |
| 2010/0162140 A1 | 6/2010 | Fereira |
| 2010/0162174 A1 | 6/2010 | Karidi |
| 2010/0179874 A1 | 7/2010 | Higgins |
| 2010/0199180 A1 | 8/2010 | Brichter |
| 2010/0211872 A1 | 8/2010 | Rolston |
| 2010/0214321 A1 | 8/2010 | Hokkanen |
| 2010/0274815 A1 | 10/2010 | Vanasco |
| 2010/0275152 A1 | 10/2010 | Atkins |
| 2010/0281409 A1 | 11/2010 | Rainisto |
| 2010/0313165 A1 | 12/2010 | Louch |
| 2010/0332958 A1 | 12/2010 | Weinberger |
| 2011/0010641 A1 | 1/2011 | Wolff |
| 2011/0083082 A1 | 4/2011 | Gottwald |
| 2011/0084962 A1 | 4/2011 | Kim |
| 2011/0093812 A1 | 4/2011 | Fong |
| 2011/0099509 A1* | 4/2011 | Horagai ................ G06F 3/0485 715/784 |
| 2011/0125846 A1 | 5/2011 | Hamana |
| 2011/0126156 A1 | 5/2011 | Krishnaraj |
| 2011/0145753 A1 | 6/2011 | Prakash |
| 2011/0157188 A1 | 6/2011 | Nakagawa |
| 2011/0164058 A1 | 7/2011 | Lemay |
| 2011/0182485 A1 | 7/2011 | Shochat |
| 2011/0184772 A1 | 7/2011 | Norton |
| 2011/0184960 A1 | 7/2011 | Delphia |
| 2011/0191685 A1 | 8/2011 | Bamford |
| 2011/0196923 A1 | 8/2011 | Marcucci |
| 2011/0202866 A1 | 8/2011 | Huang |
| 2011/0231745 A1 | 9/2011 | Levesque |
| 2011/0231802 A1 | 9/2011 | Lee |
| 2011/0238690 A1 | 9/2011 | Arrasvuori |
| 2011/0258575 A1 | 10/2011 | Cupp |
| 2011/0271230 A1* | 11/2011 | Harris ................ G06F 3/0482 715/810 |
| 2011/0276396 A1 | 11/2011 | Rathod |
| 2011/0307631 A1 | 12/2011 | Park |
| 2012/0010995 A1 | 1/2012 | Skirpa |
| 2012/0011430 A1* | 1/2012 | Parker et al. ................. 715/234 |
| 2012/0016858 A1 | 1/2012 | Rathod |
| 2012/0023407 A1 | 1/2012 | Taylor |
| 2012/0023425 A1 | 1/2012 | Hackborn |
| 2012/0030568 A1 | 2/2012 | Migos |
| 2012/0030616 A1* | 2/2012 | Howes ................ G06F 3/0481 715/800 |
| 2012/0030636 A1 | 2/2012 | Miyazaki |
| 2012/0054684 A1 | 3/2012 | Gossweiler |
| 2012/0066304 A1 | 3/2012 | Marmon |

(56) References Cited

U.S. PATENT DOCUMENTS

| | | | |
|---|---|---|---|
| 2012/0072957 A1 | 3/2012 | Cherukuwada | |
| 2012/0096393 A1 | 4/2012 | Shim | |
| 2012/0105489 A1 | 5/2012 | Monroe | |
| 2012/0110474 A1 | 5/2012 | Chen | |
| 2012/0113095 A1 | 5/2012 | Hwang | |
| 2012/0131508 A1 | 5/2012 | Lee | |
| 2012/0143701 A1 | 6/2012 | Reis | |
| 2012/0147055 A1 | 6/2012 | Pallakoff | |
| 2012/0154444 A1 | 6/2012 | Fernandez | |
| 2012/0159355 A1* | 6/2012 | Fish | G06F 3/0481 715/759 |
| 2012/0159635 A1* | 6/2012 | He et al. | 726/26 |
| 2012/0167010 A1 | 6/2012 | Campbell | |
| 2012/0169774 A1 | 7/2012 | Yu | |
| 2012/0173994 A1 | 7/2012 | Ho | |
| 2012/0179969 A1 | 7/2012 | Lee | |
| 2012/0212668 A1 | 8/2012 | Schultz | |
| 2012/0223951 A1 | 9/2012 | Dunn | |
| 2012/0240071 A1 | 9/2012 | Park | |
| 2012/0249571 A1 | 10/2012 | Houjou | |
| 2012/0278755 A1 | 11/2012 | Lehmann | |
| 2012/0314912 A1 | 12/2012 | Nakagomi | |
| 2012/0331053 A1 | 12/2012 | Dunn | |
| 2013/0060744 A1 | 3/2013 | Roychoudhuri | |
| 2013/0073970 A1 | 3/2013 | Piantino | |
| 2013/0080881 A1 | 3/2013 | Goodspeed | |
| 2013/0095857 A1 | 4/2013 | Garcia | |
| 2013/0097566 A1 | 4/2013 | Berglund | |
| 2013/0111332 A1* | 5/2013 | Davis | G06F 3/0488 715/247 |
| 2013/0111391 A1* | 5/2013 | Penner | G06F 3/04886 715/773 |
| 2013/0139111 A1 | 5/2013 | Grimes | |
| 2013/0141456 A1* | 6/2013 | Sokolov et al. | 345/620 |
| 2013/0179504 A1 | 7/2013 | Adams | |
| 2013/0187944 A1* | 7/2013 | Hamana et al. | 345/619 |
| 2013/0191711 A1* | 7/2013 | Tashman et al. | 715/205 |
| 2013/0271471 A1 | 10/2013 | Schorsch | |
| 2013/0321444 A1 | 12/2013 | Efrati | |
| 2013/0326398 A1* | 12/2013 | Zuverink | G06F 3/048 715/784 |
| 2013/0332068 A1 | 12/2013 | Kesar | |
| 2014/0040774 A1 | 2/2014 | Charytoniuk | |
| 2014/0074471 A1 | 3/2014 | Sankar | |
| 2014/0074652 A1 | 3/2014 | Wu | |
| 2014/0089816 A1 | 3/2014 | DiPersia | |
| 2014/0115446 A1 | 4/2014 | Hall | |
| 2014/0123021 A1 | 5/2014 | Walkin | |
| 2014/0123081 A1 | 5/2014 | Park | |
| 2014/0132638 A1 | 5/2014 | Matas | |
| 2014/0136946 A1 | 5/2014 | Matas | |
| 2014/0136959 A1 | 5/2014 | Matas | |
| 2014/0136995 A1 | 5/2014 | Matas | |
| 2014/0137010 A1 | 5/2014 | Matas | |
| 2014/0137011 A1 | 5/2014 | Matas | |
| 2014/0137012 A1 | 5/2014 | Matas | |
| 2014/0137013 A1 | 5/2014 | Matas | |
| 2014/0137026 A1 | 5/2014 | Matas | |
| 2014/0137030 A1 | 5/2014 | Matas | |
| 2014/0137043 A1 | 5/2014 | Matas | |
| 2014/0137046 A1 | 5/2014 | Matas | |
| 2014/0344471 A1 | 11/2014 | Valk | |
| 2014/0344716 A1 | 11/2014 | Martin | |
| 2015/0040035 A1 | 2/2015 | Neelakant | |
| 2015/0277691 A1 | 10/2015 | Matas | |

FOREIGN PATENT DOCUMENTS

| | | |
|---|---|---|
| KR | 10-2001-0013878 | 2/2001 |
| KR | 10-2004-0073180 | 8/2004 |
| KR | 10-2012-0048522 | 5/2012 |
| WO | 2010/040201 | 4/2010 |
| WO | 2012/001637 | 1/2012 |
| WO | 2012/125426 | 9/2012 |
| WO | 2012/129336 | 9/2012 |

OTHER PUBLICATIONS

Non-Final Office Action for U.S. Appl. No. 13/676,658, Feb. 25, 2015.
Non-Final Office Action for U.S. Appl. No. 13/676,831, Mar. 4, 2015.
Final Office Action for U.S. Appl. No. 13/663,229, Jan. 26, 2015.
Response to Non-Final Office Action for U.S. Appl. No. 13/663,229, Oct. 3, 2014.
Non-Final Office Action for U.S. Appl. No. 13/663,229, Jun. 3, 2014.
Response to Final Office Action for U.S. Appl. No. 13/663,229, Mar. 25, 2014.
Supplemental Response for U.S. Appl. No. 13/663,229, Mar. 20, 2014.
Final Office Action for U.S. Appl. No. 13/663,229, Sep. 25, 2013.
Response to Non-Final Office Action for U.S. Appl. No. 13/663,229, Aug. 12, 2013.
Non-Final Office Action for U.S. Appl. No. 13/663,229, Mar. 12, 2013.
Response to Non-Final Office Action for U.S. Appl. No. 13/677,002, Dec. 29, 2014.
Non-Final Office Action for U.S. Appl. No. 13/677,002, Jan. 6, 2014.
Response to Final Office Action for U.S. Appl. No. 13/677,002, Oct. 3, 2014.
Final Office Action for U.S. Appl. No. 13/677,002, May 22, 2014.
Response to Non-Final Office Action for U.S. Appl. No. 13/677,002, Feb. 6, 2014.
Non-Final Office Action for U.S. Appl. No. 13/677,002, Nov. 6, 2013.
Response to Non-Final Office Action for U.S. Appl. No. 13/677,056, Mar. 20, 2015.
Non-Final Office Action for U.S. Appl. No. 13/677,056, Dec. 12, 2014.
Notice of Allowance for U.S. Appl. No. 13/676,951, Mar. 5, 2015.
Response to Final Office Action for U.S. Appl. No. 13/676,951, Feb. 12, 2015.
Final Office Action for U.S. Appl. No. 13/676,951, Feb. 23, 2014.
Response to Non-Final Office Action for U.S. Appl. No. 13/676,951, Nov. 6, 2014.
Non-Final Office Action for U.S. Appl. No. 13/676,951, Aug. 5, 2014.
Response to Final Office Action for U.S. Appl. No. 13/676,951, Apr. 4, 2014.
Final Office Action for U.S. Appl. No. 13/676,951, Dec. 4, 2013.
Response to Non-Final Office Action for U.S. Appl. No. 13/676,951, Sep. 18, 2013.
Non-Final Office Action for U.S. Appl. No. 13/676,951, Apr. 18, 2013.
Response to Non-Final Office Action for U.S. Appl. No. 13/677,104, Feb. 12, 2015.
Non-Final Office Action for U.S. Appl. No. 13/677,104, Dec. 10, 2014.
Response to Non-Final Office Action for U.S. Appl. No. 13/677,266, Mar. 20, 2015.
Non-Final Office Action for U.S. Appl. No. 13/677,266, Dec. 22, 2014.
Non-Final Office Action for U.S. Appl. No. 13/677,269, Mar. 13, 2015.
Response to Non-Final Office Action for U.S. Appl. No. 13/677,274, Dec. 22, 2014.
Non-Final Office Action for U.S. Appl. No. 13/677,274, Dec. 22, 2014.
International Search Report and Written Opinion for International Applications No. PCT/US2013/067226, Feb. 10, 2014.
International Search Report and Written Opinion for International Applications No. PCT/US2013/067482, Feb. 19, 2014.

(56) References Cited

OTHER PUBLICATIONS

International Search Report and Written Opinion for International Applications No. PCT/US2013/067650, Feb. 19, 2014.
International Search Report and Written Opinion for International Applications No. PCT/US2013/068294, Feb. 26, 2014.
International Search Report and Written Opinion for International Applications No. PCT/US2013/067925, Feb. 19, 2014.
International Search Report and Written Opinion for International Applications No. PCT/US2013/068308, Feb. 13, 2014.
International Search Report for International Applications No. PCT/US2013/066289, Feb. 3, 2014.
"Ken Burns Effect," Wikipedia, http://en.wikipedia.org/w/index.php?title=Ken_Burns_effect&printable=yes (downloaded Sep. 18, 2012) Nov. 14, 2012.
White, Panning and Zooming in Premiere Pro CS5, Dec. 10, 2010, http://www.youtube.com/watch?v=_Okt6OVAyb8, Mar. 4, 2015.
Notice of Allowance for U.S. Appl. No. 13/676,658, Oct. 13, 2015.
Notice of Allowance for U.S. Appl. No. 13/676,658, Sep. 28, 2015.
Notice of Allowance for U.S. Appl. No. 13/676,658, Sep. 10, 2015.
Response to Non-Final Office Action for U.S. Appl. No. 13/676,658, May 26, 2015.
Notice of Allowance for U.S. Appl. No. 13/676,831, Jul. 22, 2015.
Response to Non-Final Office Action for U.S. Appl. No. 13/676,832, May 18, 2015.
Notice of Allowance for U.S. Appl. No. 13/663,229, Oct. 9, 2015.
Response to Final Office Action for U.S. Appl. No. 13/663,229, Apr. 21, 2015.
Non-Final Office Action for U.S. Appl. No. 13/677,002, Sep. 24, 2015.
Response to Final Office Action for U.S. Appl. No. 13/677,002, Sep. 3, 2015.
Final Office Action for U.S. Appl. No. 13/677,002, Apr. 30, 2015.
Response to Final Office Action for U.S. Appl. No. 13/677,056, Oct. 29, 2015.
Final Office Action for U.S. Appl. No. 13/677,056, Jun. 10, 2015.
Notice of Allowance for U.S. Appl. No. 13/676,951, May 28, 2015.
Notice of Allowance for U.S. Appl. No. 13/676,951, Apr. 23, 2015.
Final Office Action for U.S. Appl. No. 13/677,222, Sep. 17, 2015.
Response to Non-Final Office Action for U.S. Appl. No. 13/677,222, Jun. 24, 2015.
Non-Final Office Action for U.S. Appl. No. 13/677,222, Mar. 27, 2015.
Final Office Action for U.S. Appl. No. 13/677,166, Sep. 17, 2015.
Response to Non-Final Office Action for U.S. Appl. No. 13/677,166, Jun. 24, 2015.
Non-Final Office Action for U.S. Appl. No. 13/677,166, Mar. 27, 2015.
Non-Final Office Action for U.S. Appl. No. 13/677,104, Sep. 24, 2015.
Response to Final Office Action for U.S. Appl. No. 13/677,104, Jul. 27, 2015.
Final Office Action for U.S. Appl. No. 13/677,104, Mar. 27, 2015.
Response to Final Office Action for U.S. Appl. No. 13/677,266, Oct. 28, 2015.
Final Office Action for U.S. Appl. No. 13/677,266, May 26, 2015.
Final Office Action for U.S. Appl. No. 13/677,269, Sep. 10, 2015.
Response to Non-Final Office Action for U.S. Appl. No. 13/677,269 Jun. 9, 2015.
Response to Final Office Action for U.S. Appl. No. 13/677,274, Oct. 1, 2015.
Final Office Action for U.S. Appl. No. 13/677,274, Apr. 7, 2015.
Notice of Allowance for U.S. Appl. No. 13/677,256, Sep. 21, 2015.
Supplemental Response for U.S. Appl. No. 13/677,256, Sep. 8, 2015.
Response to Non-Final Office Action for U.S. Appl. No. 13/677,256, Jul. 8, 2015.
Non-Final Office Action for U.S. Appl. No. 13/677,256, Mar. 30, 2015.
Canadian Office Action for CA 2,890,279, Oct. 14, 2016.

\* cited by examiner

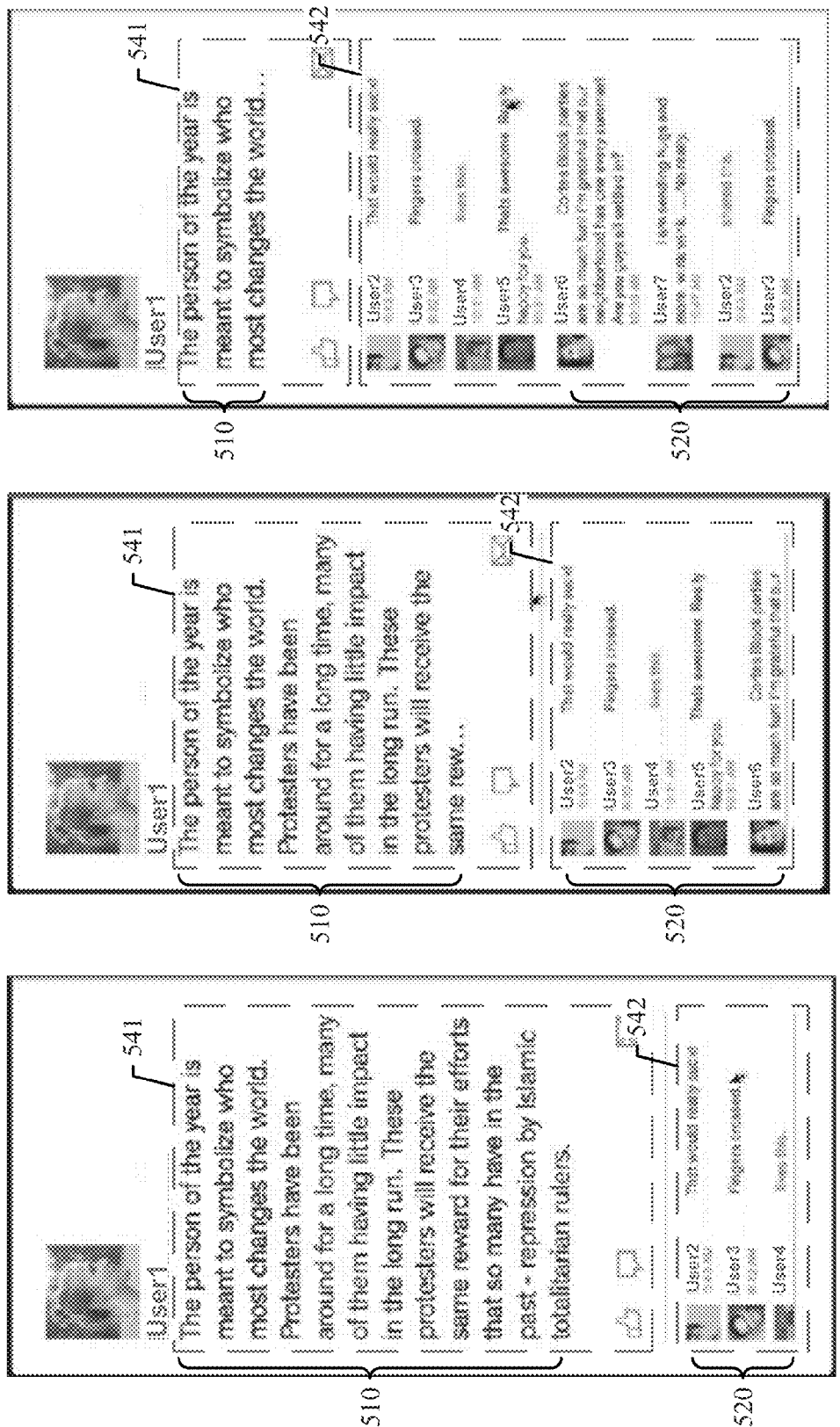

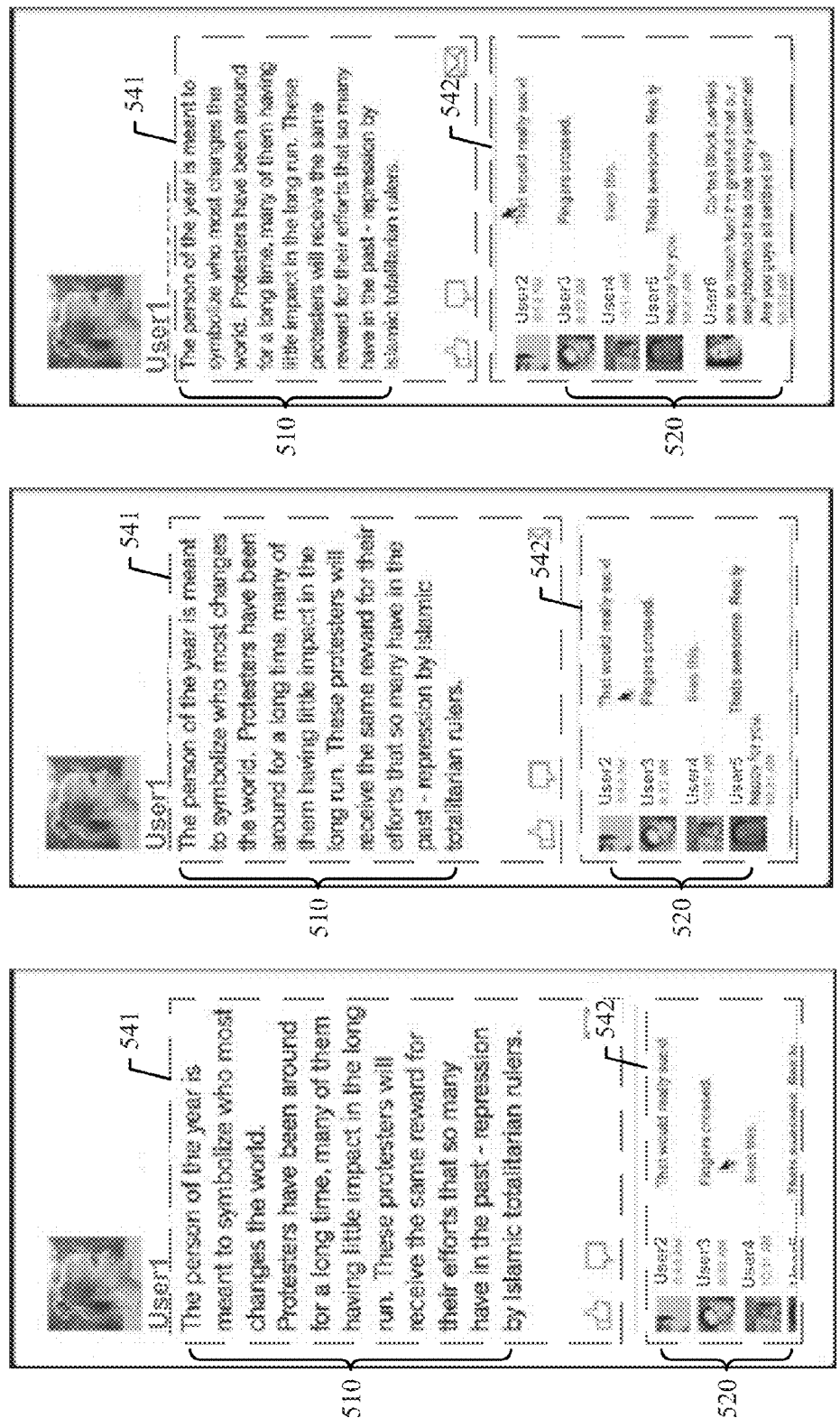

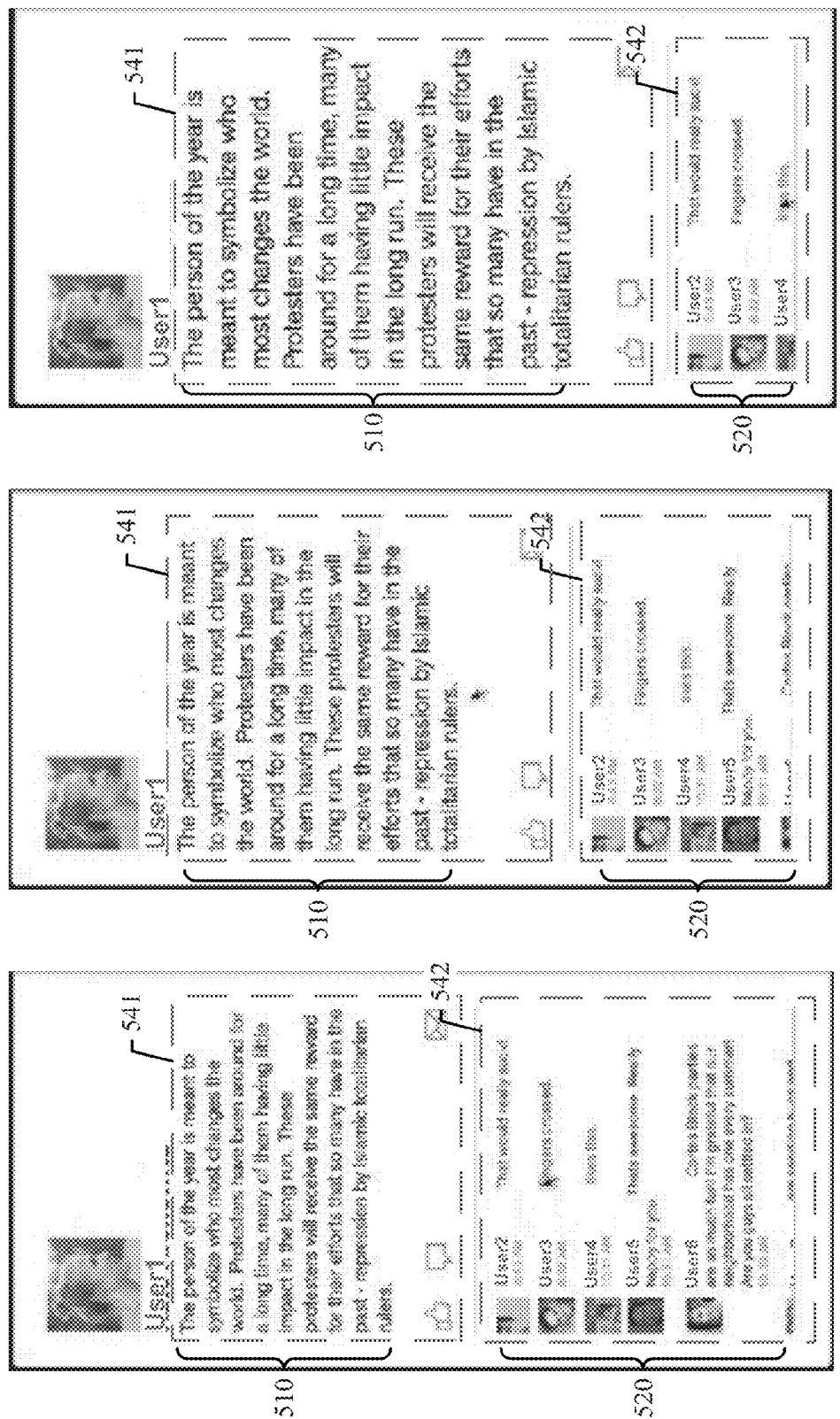

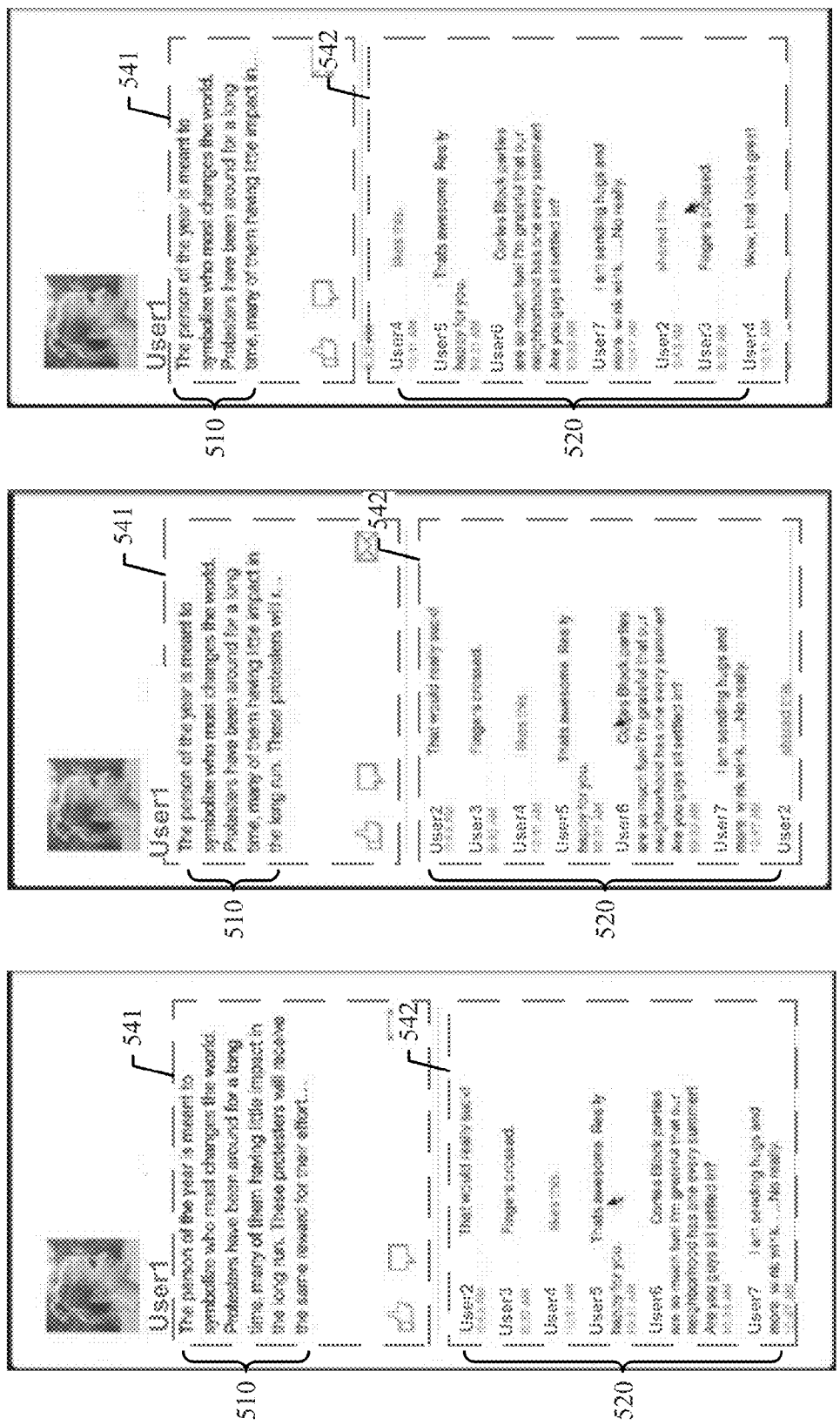

COMMENT PRESENTATION

TECHNICAL FIELD

This disclosure generally relates to a user interface.

BACKGROUND

A user interface (UI), in the industrial design field of human-machine interaction, is the space where interactions between humans and machines occur. The goal of the interactions between a human, often referred to as a "user", and a machine at the user interface is the user's control of the machine and its operations (e.g., through user input) and machine feedback (e.g., through program output). A graphical user interface (GUI) is a type of user interface that allows users to interact with software applications executing on electronic or computing devices through multimedia objects (e.g., images, videos, audios, etc.) rather than purely text commands.

SUMMARY OF PARTICULAR EMBODIMENTS

In particular embodiments, a user interface for presenting content to users may have a hierarchical structure. The user interface may have any number of content sections, and each content section may have any number of content items. The content items may be of any type or format. A user may consume or interact with some of the content items. In particular embodiments, each content item may correspond to a user-interface element.

In particular embodiments, in a user interface, a content item (e.g., a text block) may be displayed above a series of comments concerning the text block. Sometimes, not all the comments may be displayed at once (e.g., due to size limitation of the screen of the electronic device on which the text block and the comments are displayed), and so a user may scroll up and down through the comments. As the user scrolls down the series of comments, the area for displaying the text block may decrease in size (e.g., by adjusting the text block), while the area for displaying the comments may increase in size. This allows more user comments to be displayed at the same time. As the user scrolls up the series of comments and near the top of the comments, the area for displaying the text block may increase in size (e.g., returning to its initial size), while the area for displaying the comments may decrease in size (e.g., returning to its initial size).

BRIEF DESCRIPTION OF THE DRAWINGS

FIGS. 6A-6C illustrate an example of adjusting a content item so that more user comments are displayed at a time.

FIGS. 8A-8C illustrate an example of adjusting a content item so that more user comments are displayed at a time.

FIGS. 9A-9C illustrate an example of adjusting a content item so that less user comments are displayed at a time.

FIGS. 10A-10C illustrate an example of adjusting a content item so that more user comments are displayed at a time.

DESCRIPTION OF EXAMPLE EMBODIMENTS

A user interface (UI) may be incorporated into any type of software applications, including, for example, desktop applications, mobile applications, or web-based applications, to enable users to interact with and control the applications. A graphical user interface (GUI) is a type of user interface that enables users to interact with software applications through multimedia objects, including, for example, icons, buttons, menus, images, video, or audios.

Figure 1:
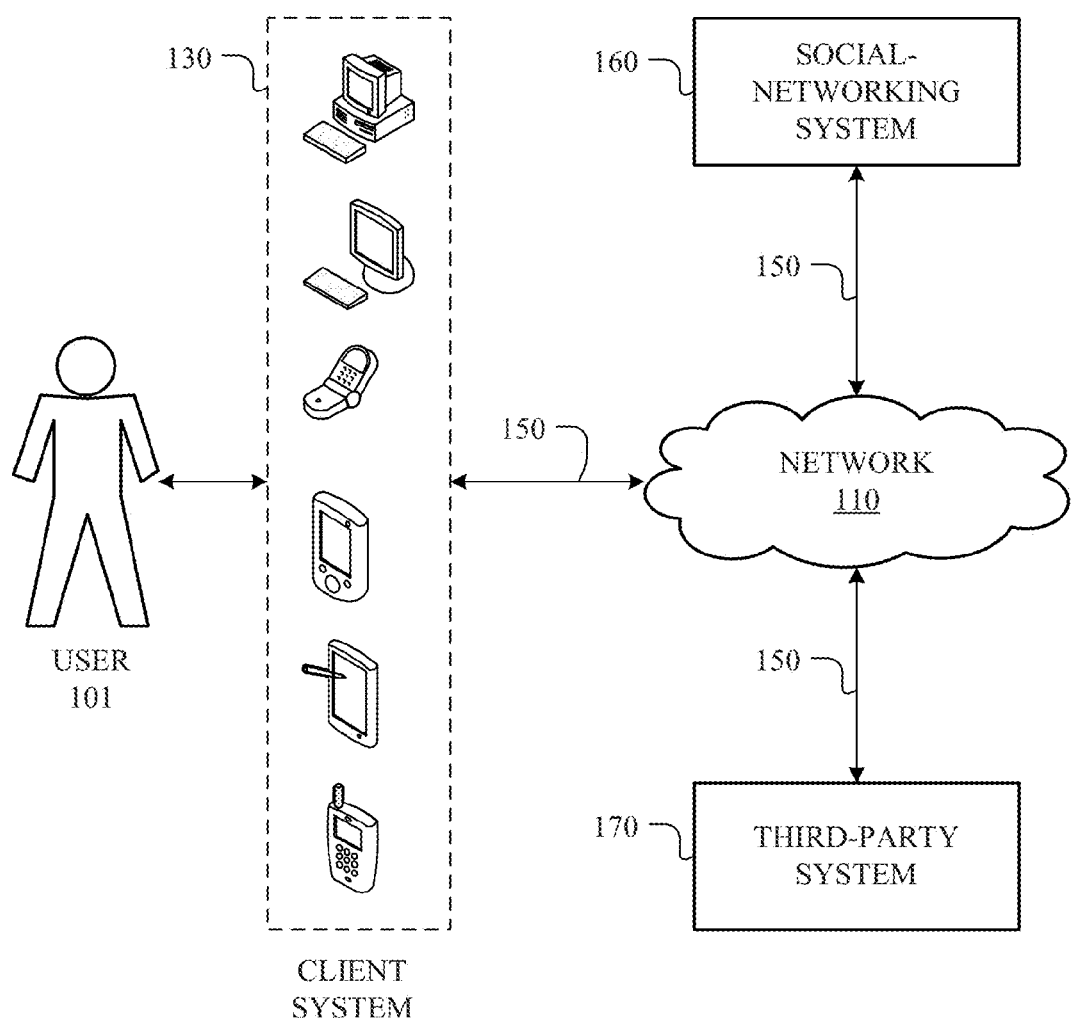
FIG. 1 illustrates an example network environment associated with a social-networking system.

In particular embodiments, a software application may be associated with a social-networking system. FIG. 1 illustrates an example network environment 100 associated with a social-networking system. Network environment 100 includes a user 101, a client system 130, a social-networking system 160, and a third-party system 170 connected to each other by a network 110. Although FIG. 1 illustrates a particular arrangement of user 101, client system 130, social-networking system 160, third-party system 170, and network 110, this disclosure contemplates any suitable arrangement of user 101, client system 130, social-networking system 160, third-party system 170, and network 110. As an example and not by way of limitation, two or more of client system 130, social-networking system 160, and third-party system 170 may be connected to each other directly, bypassing network 110. As another example, two or more of client system 130, social-networking system 160, and third-party system 170 may be physically or logically co-located with each other in whole or in part. Moreover, although FIG. 1 illustrates a particular number of users 101, client systems 130, social-networking systems 160, third-party systems 170, and networks 110, this disclosure contemplates any suitable number of users 101, client systems 130, social-networking systems 160, third-party systems 170, and networks 110. As an example and not by way of limitation, network environment 100 may include multiple users 101, client system 130, social-networking systems 160, third-party systems 170, and networks 110.

In particular embodiments, user 101 may be an individual (human user), an entity (e.g., an enterprise, business, or third-party application), or a group (e.g., of individuals or entities) that interacts or communicates with or over social-networking system 160. In particular embodiments, social-networking system 160 may be a network-addressable computing system hosting an online social network. Social-networking system 160 may generate, store, receive, and transmit social-networking data, such as, for example, user-profile data, concept-profile data, social-graph information, or other suitable data related to the online social network. Social-networking system 160 may be accessed by the other components of network environment 100 either directly or via network 110. In particular embodiments, social-networking system 160 may include an authorization server that allows users 101 to opt in or opt out of having their actions logged by social-networking system 160 or shared with other systems (e.g., third-party systems 170), such as, for example, by setting appropriate privacy settings. In particular embodiments, third-party system 170 may be a network-addressable computing system that can host various third-party software applications (e.g., web-based applications). Third-party system 170 may generate, store, receive, and transmit various types of data, such as, for example, texts, images, videos, or audios. Third-party system 170 may be accessed by the other components of network environment 100 either directly or via network 110. In particular embodiments, one or more users 101 may use one or more client systems 130 to access, send data to, and receive data from social-networking system 160 or third-party system 170. Client system 130 may access social-networking system 160 or third-party system 170 directly, via network 110, or via a third-party system. As an example and not by way of limitation, client system 130 may access third-party system 170 via social-networking system 160. Client system 130 may be any suitable computing device, such as, for example, a personal computer, a laptop computer, a cellular telephone, a smartphone, or a tablet computer.

This disclosure contemplates any suitable network 110. As an example and not by way of limitation, one or more portions of network 110 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 110 may include one or more networks 110.

Links 150 may connect client system 130, social-networking system 160, and third-party system 170 to communication network 110 or to each other. This disclosure contemplates any suitable links 150. In particular embodiments, one or more links 150 include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 150 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 150, or a combination of two or more such links 150. Links 150 need not necessarily be the same throughout network environment 100. One or more first links 150 may differ in one or more respects from one or more second links 150.

In particular embodiments, data (e.g., data representing various types of information or content) may be sent between servers associated with social-networking system 160 and individual client systems 130 via network 110. When two electronic devices (e.g., a server and a client) are connected to a network (e.g., a computer or communications network, such as network 110), data may be transmitted between the two devices over the network using one or more suitable network protocols. A network may include any number of sub-networks. By transmitting data between the two devices, the two devices may communicate with each other.

In network communications, there are two ways to send a communication (i.e., data) from one device to another device: push and pull. With push technology, the request for the communication transaction is initiated by the sending device. That is, the sending device "pushes" the communication, so to speak, to the receiving device. In this case, the sending device may be considered the active party and the receiving device may be considered the passive party in the transaction. In contrast, with pull technology, the request for the communication transaction is initiated by the receiving device. That is, the receiving device "pulls" the communication, so to speak, from the sending device. In this case, the sending device may be considered the passive party and the receiving device may be considered the active party in the transaction. In particular embodiments, a server associated with social-networking system 160 may push data to a client system 130. A communication pushed from a server to a client may be referred to as a "push notification". Similarly, a client system 130 may push data to a server associated with social-networking system 160.

In particular embodiments, a client system 130 may be a mobile electronic or computing device. A mobile electronic device—such as a Smartphone, tablet computer, or laptop computer—may include functionality for determining its location, direction, or orientation, such as a GPS receiver, compass, or gyroscope. Such a mobile device may also include functionality for wireless communication, such as BLUETOOTH communication, near-field communication (NFC), or infrared (IR) communication or communication with a wireless local area networks (WLANs) or cellular-telephone network. Such a mobile device may also include one or more cameras, scanners, touchscreens, microphones, or speakers. Mobile electronic devices may also execute software applications, such as games, web browsers, or social-networking applications. With social-networking applications, users may connect, communicate, and share information with other users in their social networks.

Figure 2A:
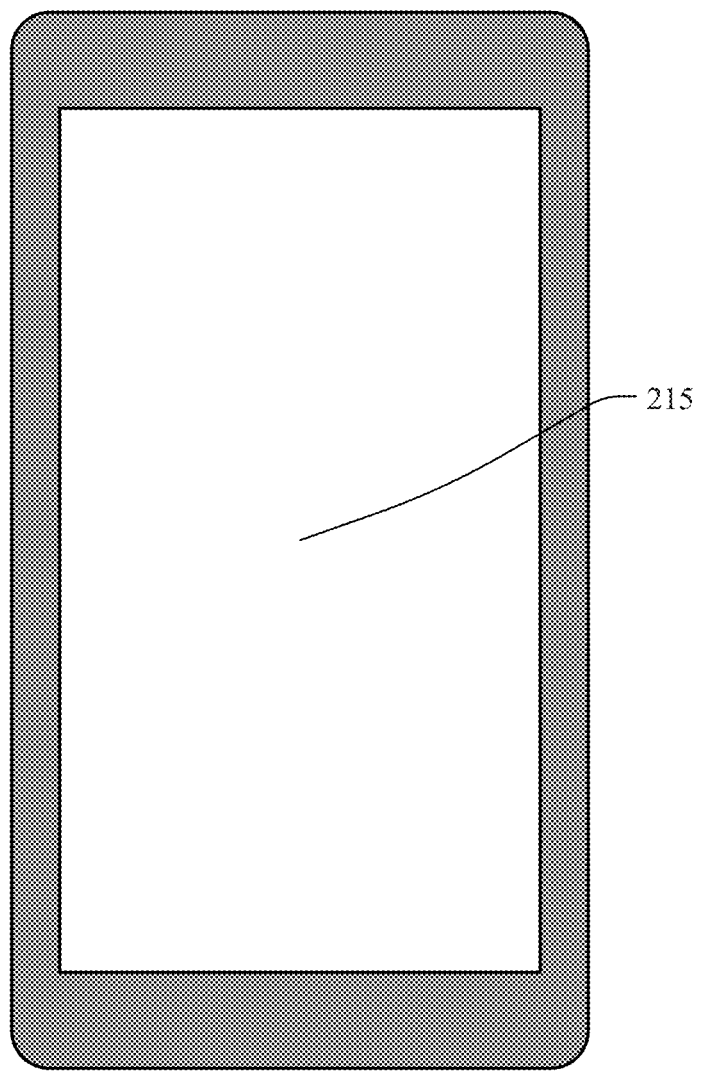
FIGS. 2A and 2B illustrate two example mobile electronic devices.

In particular embodiments, a mobile electronic device (e.g., Smartphone or tablet computer) may include a touch-screen capable of receiving touch input. FIG. 2A illustrates an example mobile electronic device 210 (e.g., a Smartphone) having a touchscreen 215. Touchscreen 215 may incorporate one or more touch sensors and a touch-sensor controller for detecting the presence and location of a touch (e.g., from a user's finger) or the proximity of an object (e.g., a stylus). In particular embodiments, a specific touch detected via touchscreen 215 may result in a touch input event.

Figure 2B:
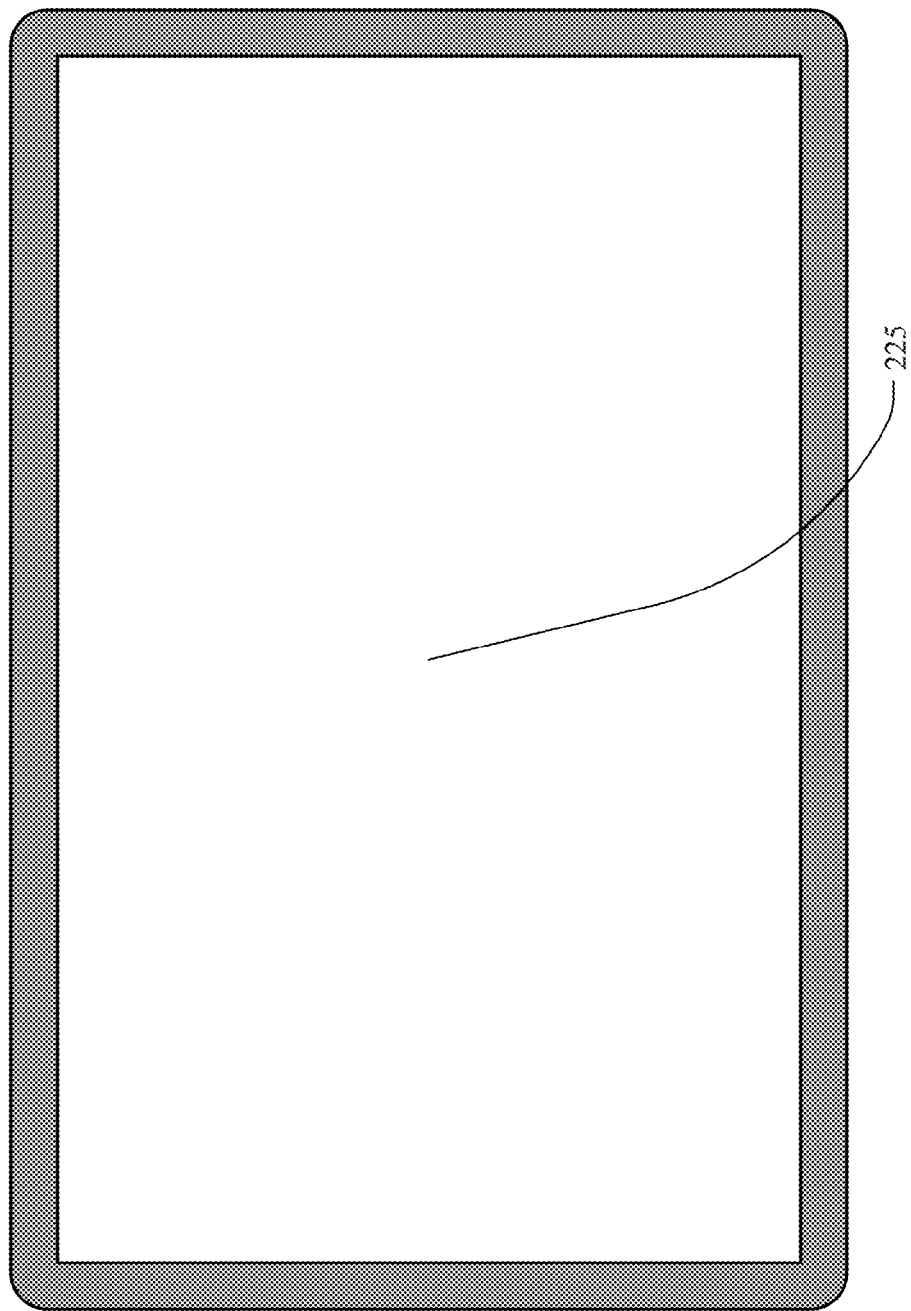

Different mobile electronic devices may have different designs. As a result, the size, shape, or aspect ration of the touchscreens of different mobile devices may differ. FIG. 2B illustrates another example mobile electronic device 220 (e.g., a tablet computer) having a touchscreen 225. Similarly, touchscreen 225 may incorporate one or more touch sensors and a touch-sensor controller for detecting the presence and location of a touch (e.g., from a user's finger) or the proximity of an object (e.g., a stylus). A specific touch detected via touchscreen 225 may result in a touch input event. However, since mobile electronic devices 210 and 220 are two different types of devices, their respective touchscreen 215 and 225 have different sizes and aspect ratios.

There may be various types of touches or gestures, such as single tap, double tap, short press, long press, slide, swipe, flip, pinch open, or pinch close, corresponding to various types of touch input events. Different touch input events may result in different responses and this disclosure contemplates any applicable gesture.

Social-networking system 160 may store various types of data including, for example, user data, application data, or social data. In particular embodiments, such data may be stored in a graph having any number of nodes and edges, where each edge connects two nodes. The graph is often referred to as a "social graph" or "open graph" as it contains, among others, social information.

Figure 3:
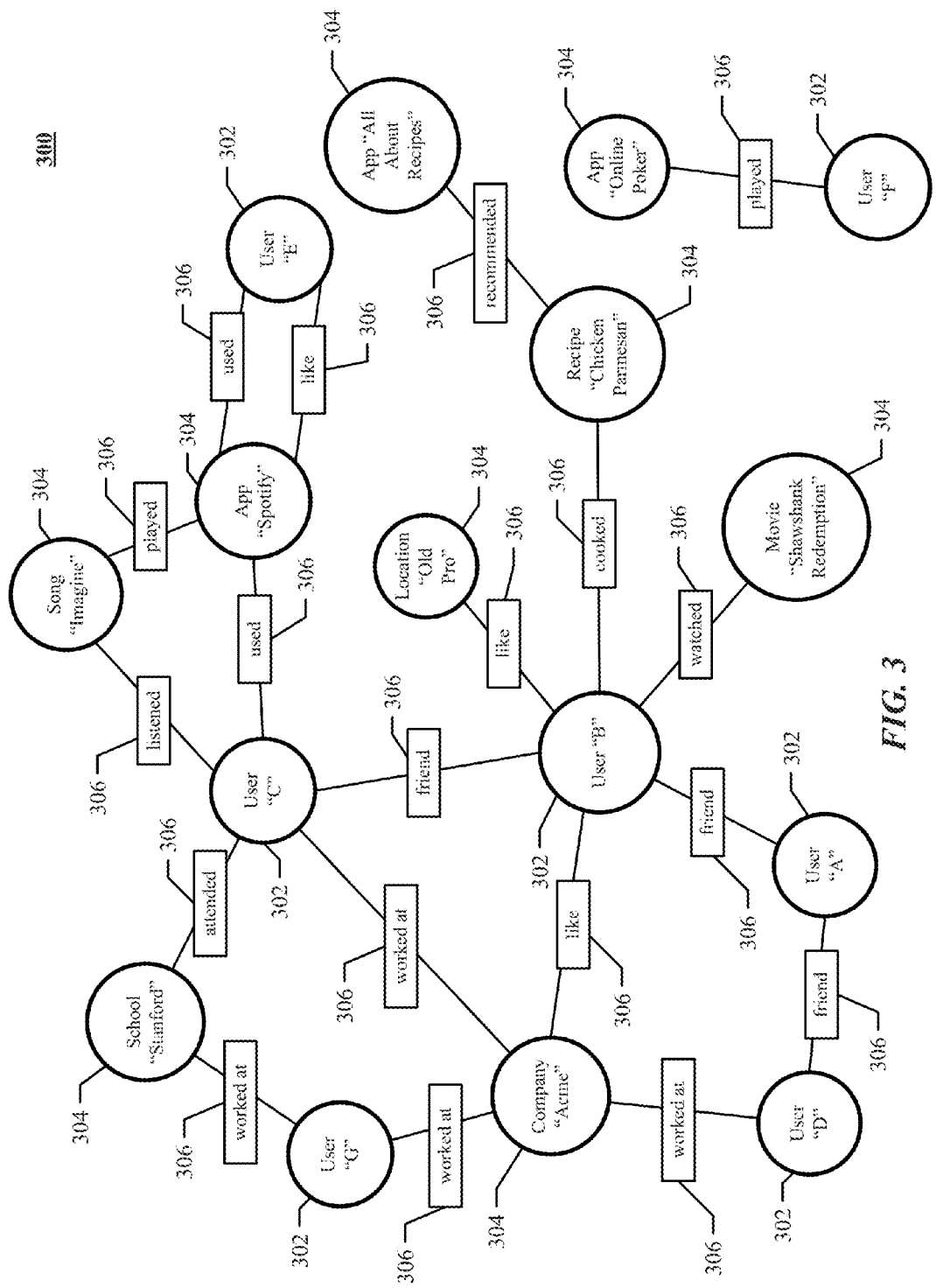
FIG. 3 illustrates an example social graph.

FIG. 3 illustrates example social graph 300. In particular embodiments, social-networking system 160 may store one or more social graphs 300 in one or more data stores. In particular embodiments, social graph 300 may include multiple nodes—which may include multiple user nodes 302 or multiple concept nodes 304—and multiple edges 306 connecting the nodes. Example social graph 300 illustrated in FIG. 3 is shown, for didactic purposes, in a two-dimensional visual map representation. In particular embodiments, a social-networking system 160, client system 130, or third-party system 170 may access social graph 300 and related social-graph information for suitable applications. The nodes and edges of social graph 300 may be stored as data objects, for example, in a data store (such as a social-graph database). Such a data store may include one or more searchable or queryable indexes of nodes or edges of social graph 300.

In particular embodiments, a user node 302 may correspond to a user of social-networking system 160. As an example and not by way of limitation, a user may be an individual (human user), an entity (e.g., an enterprise, business, or third-party application), or a group (e.g., of individuals or entities) that interacts or communicates with or over social-networking system 160. In particular embodiments, when a user registers for an account with social-networking system 160, social-networking system 160 may create a user node 302 corresponding to the user, and store the user node 302 in one or more data stores. Users and user nodes 302 described herein may, where appropriate, refer to registered users and user nodes 302 associated with registered users. In addition or as an alternative, users and user nodes 302 described herein may, where appropriate, refer to users that have not registered with social-networking system 160. In particular embodiments, a user node 302 may be associated with information provided by a user or information gathered by various systems, including social-networking system 160. As an example and not by way of limitation, a user may provide his or her name, profile picture, contact information, birth date, sex, marital status, family status, employment, education background, preferences, interests, or other demographic information. In particular embodiments, a user node 302 may be associated with one or more data objects corresponding to information associated with a user. In particular embodiments, a user node 302 may correspond to one or more webpages.

In particular embodiments, a concept node 304 may correspond to a concept. As an example and not by way of limitation, a concept may correspond to a place (such as, for example, a movie theater, restaurant, landmark, or city); a website (such as, for example, a website associated with social-network system 160 or a third-party website associated with a web-application server); an entity (such as, for example, a person, business, group, sports team, or celebrity); a resource (such as, for example, an audio file, video file, digital photo, text file, structured document, or application) which may be located within social-networking system 160 or on an external server, such as a web-application server; real or intellectual property (such as, for example, a sculpture, painting, movie, game, song, idea, photograph, or written work); a game; an activity; an idea or theory; another suitable concept; or two or more such concepts. A concept node 304 may be associated with information of a concept provided by a user or information gathered by various systems, including social-networking system 160. As an example and not by way of limitation, information of a concept may include a name or a title; one or more images (e.g., an image of the cover page of a book); a location (e.g., an address or a geographical location); a website (which may be associated with a URL); contact information (e.g., a phone number or an email address); other suitable concept information; or any suitable combination of such information. In particular embodiments, a concept node 304 may be associated with one or more data objects corresponding to information associated with concept node 304. In particular embodiments, a concept node 304 may correspond to one or more webpages.

In particular embodiments, a node in social graph 300 may represent or be represented by a webpage (which may be referred to as a "profile page"). Profile pages may be hosted by or accessible to social-networking system 160. Profile pages may also be hosted on third-party websites associated with a third-party server 170. As an example and not by way of limitation, a profile page corresponding to a particular external webpage may be the particular external webpage and the profile page may correspond to a particular concept node 304. Profile pages may be viewable by all or a selected subset of other users. As an example and not by way of limitation, a user node 302 may have a corresponding user-profile page in which the corresponding user may add content, make declarations, or otherwise express himself or herself. As another example and not by way of limitation, a concept node 304 may have a corresponding concept-profile page in which one or more users may add content, make declarations, or express themselves, particularly in relation to the concept corresponding to concept node 304.

In particular embodiments, a concept node 304 may represent a third-party webpage or resource hosted by a third-party system 170. The third-party webpage or resource may include, among other elements, content, a selectable or other icon, or other inter-actable object (which may be implemented, for example, in JavaScript, AJAX, or PHP codes) representing an action or activity. As an example and not by way of limitation, a third-party webpage may include a selectable icon such as "like," "check in," "eat," "recommend," or another suitable action or activity. A user viewing the third-party webpage may perform an action by selecting one of the icons (e.g., "eat"), causing a client system 130 to transmit to social-networking system 160 a message indicating the user's action. In response to the message, social-networking system 160 may create an edge (e.g., an "eat" edge) between a user node 302 corresponding to the user and a concept node 304 corresponding to the third-party webpage or resource and store edge 306 in one or more data stores.

In particular embodiments, a pair of nodes in social graph 300 may be connected to each other by one or more edges 306. An edge 306 connecting a pair of nodes may represent a relationship between the pair of nodes. In particular embodiments, an edge 306 may include or represent one or more data objects or attributes corresponding to the relationship between a pair of nodes. As an example and not by way of limitation, a first user may indicate that a second user is a "friend" of the first user. In response to this indication, social-networking system 160 may transmit a "friend request" to the second user. If the second user confirms the "friend request," social-networking system 160 may create an edge 306 connecting the first user's user node 302 to the second user's user node 302 in social graph 300 and store edge 306 as social-graph information in one or more of data stores (e.g., data stores associated with social-networking system 160). In the example of FIG. 3, social graph 300 includes an edge 306 indicating a friend relation between user nodes 302 of user "A" and user "B" and an edge indicating a friend relation between user nodes 302 of user "C" and user "B." Although this disclosure describes or illustrates particular edges 306 with particular attributes connecting particular user nodes 302, this disclosure contemplates any suitable edges 306 with any suitable attributes connecting user nodes 302. As an example and not by way of limitation, an edge 306 may represent a friendship, family relationship, business or employment relationship, fan relationship, follower relationship, visitor relationship, subscriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in social graph 300 by one or more edges 306.

In particular embodiments, an edge 306 between a user node 302 and a concept node 304 may represent a particular action or activity performed by a user associated with user node 302 toward a concept associated with a concept node 304. As an example and not by way of limitation, as illustrated in FIG. 3, a user may "like," "attended," "played," "listened," "cooked," "worked at," or "watched" a concept, each of which may correspond to a edge type or subtype. A concept-profile page corresponding to a concept node 304 may include, for example, a selectable "check in" icon (such as, for example, a clickable "check in" icon) or a selectable "add to favorites" icon. Similarly, after a user clicks these icons, social-networking system 160 may create a "favorite" edge or a "check in" edge in response to a user's action corresponding to a respective action. As another example and not by way of limitation, a user (user "C") may listen to a particular song ("Ramble On") using a particular application (SPOTIFY, which is an online music application). In this case, social-networking system 160 may create a "listened" edge 306 and a "used" edge (as illustrated in FIG. 3) between user nodes 302 corresponding to the user and concept nodes 304 corresponding to the song and application to indicate that the user listened to the song and used the application. Moreover, social-networking system 160 may create a "played" edge 306 (as illustrated in FIG. 3) between concept nodes 304 corresponding to the song and the application to indicate that the particular song was played by the particular application. In this case, "played" edge 306 corresponds to an action performed by an external application (SPOTIFY) on an external audio file (the song "Imagine"). Although this disclosure describes particular edges 306 with particular attributes connecting user nodes 302 and concept nodes 304, this disclosure contemplates any suitable edges 306 with any suitable attributes connecting user nodes 302 and concept nodes 304. Moreover, although this disclosure describes edges between a user node 302 and a concept node 304 representing a single relationship, this disclosure contemplates edges between a user node 302 and a concept node 304 representing one or more relationships. As an example and not by way of limitation, an edge 306 may represent both that a user likes and has used at a particular concept. Alternatively, another edge 306 may represent each type of relationship (or multiples of a single relationship) between a user node 302 and a concept node 304 (as illustrated in FIG. 3 between user node 302 for user "E" and concept node 304 for "SPOTIFY").

In particular embodiments, social-networking system 160 may create an edge 306 between a user node 302 and a concept node 304 in social graph 300. As an example and not by way of limitation, a user viewing a concept-profile page (such as, for example, by using a web browser or a special-purpose application hosted by the user's client system 130) may indicate that he or she likes the concept represented by the concept node 304 by clicking or selecting a "Like" icon, which may cause the user's client system 130 to transmit to social-networking system 160 a message indicating the user's liking of the concept associated with the concept-profile page. In response to the message, social-networking system 160 may create an edge 306 between user node 302 associated with the user and concept node 304, as illustrated by "like" edge 306 between the user and concept node 304. In particular embodiments, social-networking system 160 may store an edge 306 in one or more data stores. In particular embodiments, an edge 306 may be automatically formed by social-networking system 160 in response to a particular user action. As an example and not by way of limitation, if a first user uploads a picture, watches a movie, or listens to a song, an edge 306 may be formed between user node 302 corresponding to the first user and concept nodes 304 corresponding to those concepts. Although this disclosure describes forming particular edges 306 in particular manners, this disclosure contemplates forming any suitable edges 306 in any suitable manner.

In particular embodiments, a set of objects may be organized into a hierarchy based on, for example, how the individual objects are related to each other. An object hierarchy may have any number of levels, and at each level, there may be any number of objects. Parent-child or sibling relationships may exist between specific objects in the hierarchy. Within an object hierarchy, a parent object is one level above the level of its child objects. Two sibling objects are at the same level and share the same parent object. In addition, any portion of the hierarchy may also be considered a hierarchy in itself.

Figure 4:
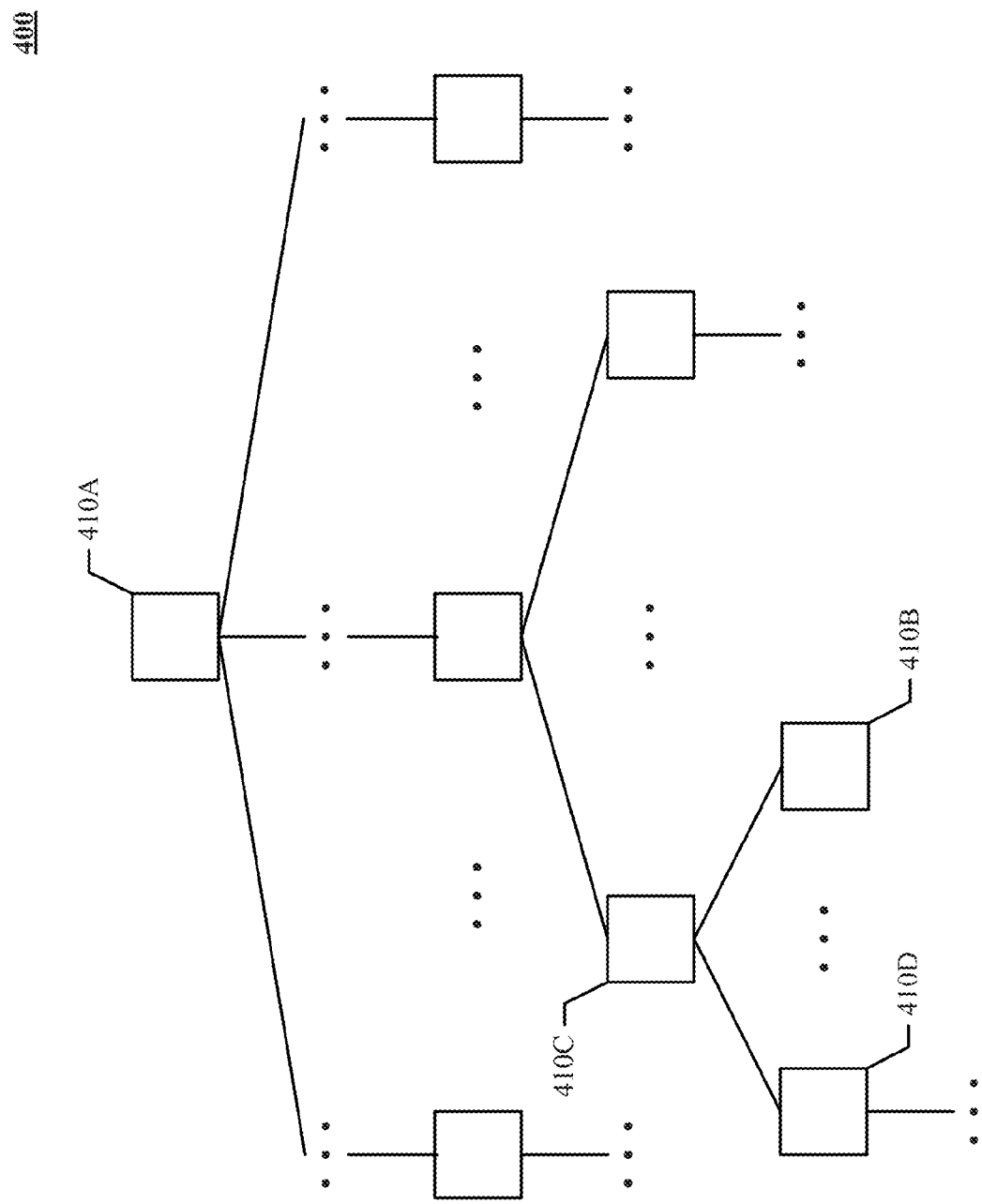
FIG. 4 illustrates an example object hierarchy.

FIG. 4 illustrates a portion of an example object hierarchy 400 that includes a number of objects 410. FIG. 4 is in fact a visual representation of an object hierarchy. Each node represents a specific object in the hierarchy, and each edge connecting two nodes represents a parent-child relationship between the two corresponding objects.

In particular embodiments, an object in a hierarchy may or may not have a parent. If an object does not have a parent, it may be referred to as a "root" object (e.g., object 410A). Typically, the root object is positioned at the first or topmost level of the hierarchy. In particular embodiments, an object in a hierarchy may or may not have any children. If an object does not have any children, it may be referred to as a "leaf" or "terminal" object (e.g., object 410B). If an object does have children (e.g., object 410C), it may have any number of children. In addition, objects sharing the same parent may be referred to as each other's "siblings". For example, in FIG. 4, object 410C is the parent of objects 410D and 410B. Objects 410D and 410B are the children of object 410C and are siblings to each other. Thus, a hierarchy of objects (e.g., object hierarchy 400) not only includes the individual objects (e.g., objects 410) themselves but also indicates the relationships among the specific objects. Moreover, the position of a specific object within the hierarchy may indicate its relationships with other objects in the hierarchy.

Objects 410 may be of various types, and this disclosure contemplates any applicable object types. For example and without limitation, the term "object" may refer to any type of content, including but not limited to images, videos, captions, text blocks or boxes, user-interface elements, clickable links, newsfeed stories, references to other objects, advertisements, calendar events, units for displaying open graph analysis that may be graphically rendered, applications, websites, web pages, books, chapters. In particular embodiments, given a hierarchy of objects, which may be a portion of another, larger hierarchy of objects, the hierarchical relationships (e.g., parent-child or sibling relationships, positions of the objects within the hierarchy) between specific objects may direct some aspects of how these objects behave in the context of a user interface or how the objects are presented to a user.

As an example, in the context of the desktop of a computing device, the desktop may be a parent object, and sometimes the root object of a hierarchy, whose child objects are the individual software applications available on the desktop. A software application, while itself being one of the child objects of the desktop, is also the parent object of the individual components of that software application. Different software applications may include different components. For example, for a software application that manages digital books (e.g., a book reader application), its components may include the digital books available, the individual chapters of each book, the pages of each chapter, and the texts, images, videos, audios, or other content or media elements on each page. Each of these also corresponds to an object (e.g., user-interface component) in the hierarchy. More specifically, within the hierarchy, the digital book application may be the parent object of the digital books. A digital book may be the parent object of the individual chapters of that book. A chapter, while itself being one of the child objects of the book, is also the parent object of the pages in that chapter. A page is the parent object of the texts, images, videos, audios, or other content or media elements on that page. A text block, image, video, audio, or other content or media element is one of the child objects of the page to which it belongs. Similarly, for a software application that manages news feeds, its components may include the individual news channels and the news stories within each channel. Each of these may correspond to an object. Within the hierarchy, the news-feed application, while itself being one of the child objects of the desktop, is also the parent object of the news channels. A news channel in turn is the parent object of the news stories included in that channel.

As another example, in the context of the Internet or the World Wide Web, the Internet may be a parent object whose child objects are the individual websites. A website, while itself being one of the child objects of the Internet, is also the parent object of the individual web pages of that website. A web page, while itself being one of the child objects of the website to which it belongs, is the parent object of the texts, images, videos, audios, or links (e.g., Uniform Resource Locators (URLs)) included in the web page. Each text block, image, video, audio, or link may also correspond to a specific object in the hierarchy.

As a third example, a website, such as a social-networking website implemented by social-networking system 160, may also be arranged in a hierarchical structure for navigating the content of the social-networking website. In this context, the social-networking website may be a parent object whose child objects are the components (e.g., photo albums, user profile pages, etc.) of the website. For example, a photo album, while itself being a child object of the social-networking website, may in turn be a parent object, and the individual photos within the album may be the child objects of the photo album. A user's profile page may be structured in such a hierarchical fashion as well. The profile page itself may be considered a parent object, and the individual objects on the profile page may be the child objects of the profile page. In particular embodiments, a profile page may be considered and rendered (e.g., for presentation to a user) as a linear timeline of objects, such as, for example and without limitation, photos, photo albums, check-ins, comments from other users, attended events, tags, applications the user has added to the profile page, stories, songs the user has listened to, playlists. These various types of objects may all be children of the profile page, or may be further arranged into multiple levels. With some implementations, a user's profile page may include any number of sections, such as the user's education and employment information, the user's public "wall", or the user's social connections. Then the various types of objects above may be divided into specific sections.

In particular embodiments, an object 410 may be a component of a user interface. In this case, object hierarchy 400 may correspond to the user interface, and each object 410 may correspond to a specific component of the user-interface. A user interface may have various types of components, and this disclosure contemplates any applicable user-interface component types. For example, a user-interface component (i.e., an object 410) may be a window, a section, a tab, an image, a video, an audio, a text block, a menu, an icon, a button, a checkbox, a website, a web page, a frame, a clickable link, a message, a post, or an input field. In particular embodiments, an object 410 may be consumed by a user if the user is able to, for example and without limitation, interact with, view, read, listen to, manipulate, or handle the object 410. For example, some user-consumable objects 410 may be texts, images, videos, audios, feeds, executables (e.g., application programs or games), websites, web pages, digital books, photo albums, posts, or messages.

In particular embodiments, when the user interface corresponding to object hierarchy 400 is displayed (e.g., on a client system 130), the structure of the corresponding object hierarchy 400 may reflect the structure of the user interface. The relationships among the individual components in the user interface, as reflected in object hierarchy 400, may influence how these components are organized and presented to users. The user interface may have any number of layers, respectively corresponding to the individual levels of object hierarchy 400. Objects 410 (e.g., user-interface components) at a specific level of object hierarchy 400 are displayed in the corresponding layer of the user interface. With some implementations, the lowest or bottommost layer of the user interface corresponds to the first or topmost level of object hierarchy 400. Thus, root object 410A is displayed in the lowest layer of the user interface. Furthermore, in the user interface, each object 410 (e.g., user-interface component) is displayed in a layer immediately above the layer where its parent, if one exists, is displayed and immediately below the layer where its children, if any, are displayed. Sibling objects 410 are displayed at the same layer. Thus, the position of a component in the user interface indicates its relationships (e.g., parent-child or sibling) with other components in the user interface.

In particular embodiments, a user-interface component (e.g., an image, a video, a folder, etc.) may be displayed in various display modes. As an example, the user-interface component may be displayed in a "full-screen" mode, where the user-interface component occupies the entire or nearly the entire display area (e.g., the screen of an electronic device). As another example, the user-interface component may be displayed in an "on-page" mode, where the user-interface component is included in another user-interface component and displayed as a part of that other user-interface component (e.g., an image is displayed as a part of a web page). As a third example, the user-interface component may be displayed in an "index" mode, where the user-interface component is a part of a series of user-interface components (e.g., an image is displayed together with other images from the same album, or a chapter of a book is displayed in the table of content of the book together with other chapters from the same book).

In particular embodiments, a hierarchical user interface may be used to present content to a user. Such a user interface may be referred to as a "content feed" or "news feed" user interface. The content may be of any type and format, such as, for example and without limitation, text, icon, image, video, audio, web page, post, or message. This disclosure contemplates any applicable content type and format. In particular embodiments, the individual content items (e.g., text, image, video, audio, web page, post, message, news piece, etc.) may be organized into various categories, referred to as content sections. For example, related content items may be categorized into the same content section. The user interface may include any number of content sections, and each content section may include any number of content items. Hierarchically, a content section may be the parent of the content items belonging to that section. For example, various photos taken during a holiday trip may be organized into the same album, and various photo albums may be organized into the photo section of the user interface.

In particular embodiments, a user may consume or interact with a specific content item. For example, a user consumes a content item when the user scrolls, opens up, views, listens to, selects, reviews, or comments on the content item. A user interacts with a content item when the user selects, clicks on, taps, reviews, or comments on the content item. This disclosure contemplates any applicable means for a user to consume or interact with a content item.

Figure 5:
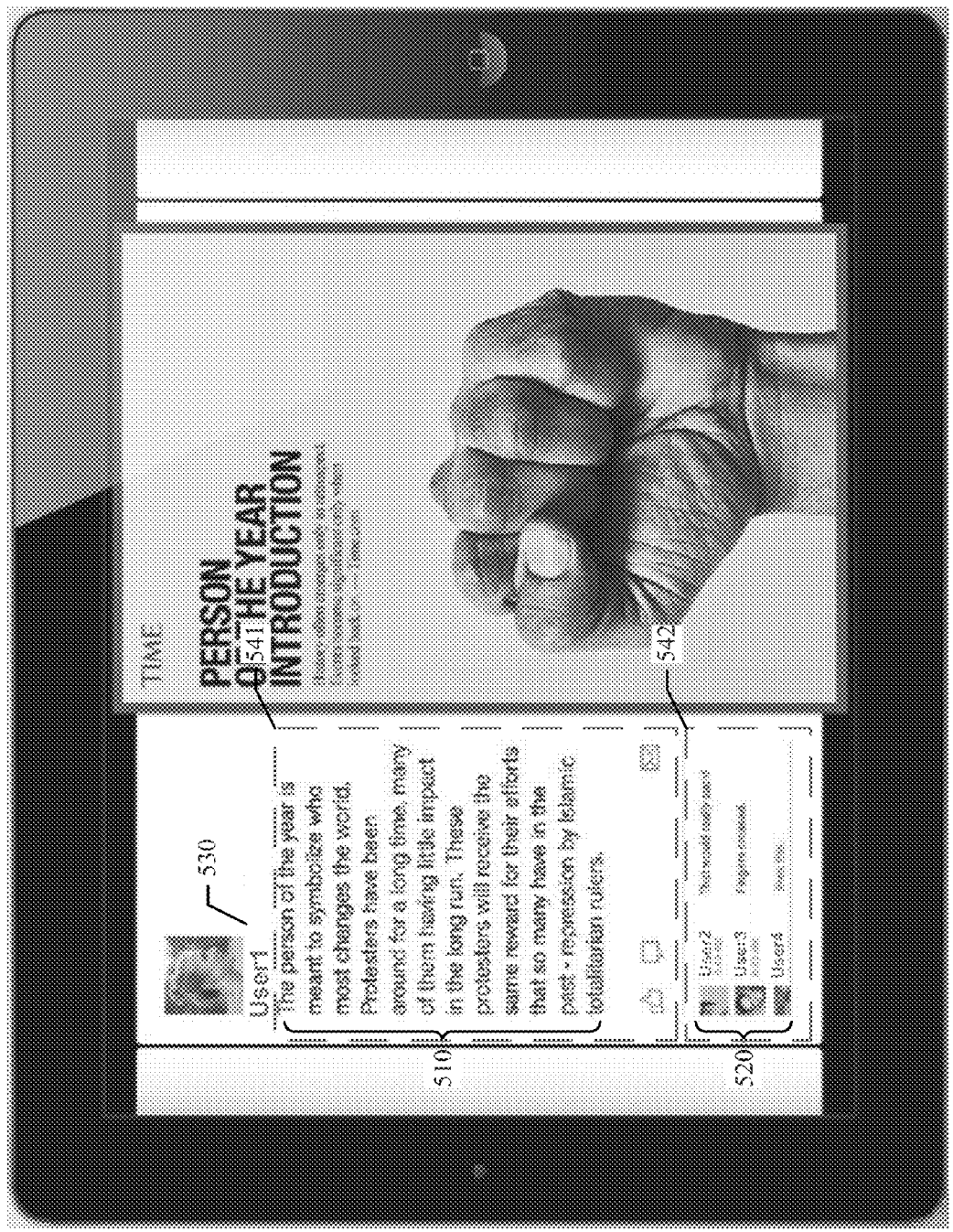
FIG. 5 illustrates an example content item and its related user comments.

In particular embodiments, a content item, when published so that users are able to view it, may receive user comments. Each user comment may be considered a specific content item as well, since a content item can be of any type. In some cases, the user comments concerning a content item may be displayed together with the content item itself (e.g., in close proximity to the content item) so that the users can view the content item and its user comments together. For example, FIG. 5 illustrates an example content item 510 and a series of user comments 520 concerning content time 510. Here, content item 510 is a text block, which includes the personal opinion of a user 530 (e.g., Kate Aronowitz) on the Time Magazine's "Person of the Year" article. A few user comments 520 are displayed below text block 510. These user comments 520 have been submitted by various users in response to user 530's published personal opinion.

User comments 520 are displayed below content item 510. At this time, text block 510 occupies a space 541 on the screen of an electronic device, while user comments 520 occupy a space 542 on the screen of the electronic device. Space 541 is larger than space 542 so that text block 510 can be displayed in its entirety. Consequently, not all available user comments concerning text block 510 can be displayed in space 542 at the same time, due to the size limitation of the screen of the electronic device, and only a few user comments 520 are currently displayed in space 542.

However, if a user wishes to view other available user comments concerning text block 510, the user may scroll through the user comments to read the individual comments. In fact, the available user comments may be arranged in a series. In this example, user comments 520 from the series of user comments are displayed in a vertical column. Thus, to scroll through this series of user comments, the user may scroll up or down along the vertical column.

In particular embodiments, while the user is scrolling up or down through a series of user comments, the spaces (e.g., spaces 541 and 542) where content item 510 and user comments 520 are displayed, respectively, may be adjusted accordingly. With some implementations, while a user is scrolling down a series of user comments, space 541 where content item 510 is displayed may decrease in size while space 542 where user comments 520 are displayed may increase in size accordingly, so that more user comments 520 can be displayed on the screen of the electronic device at a time. Conversely, while the user is scrolling up a series of user comments and approaching near the top of the series, space 541 where content item 510 is displayed may increase in size while space 542 where user comments 520 are displayed may decrease in size accordingly, so that content item 510 can be displayed in its entirety.

To further explain, consider an example illustrated in FIGS. 6A-6C. In FIG. 6A, text block 510 (i.e., a content item) is displayed in space 541, and user comments 520 are displayed in space 542 below text block 510. User comments 520 are from a series of user comments concerning text block 510. However, due to the size limitation of the screen and thus of space 542, only about three user comments 520 are currently displayed in space 542.

Suppose that a user begins to scroll down the series of user comments. As the user is scrolling down the series of user comments, space 541 where text block 510 is displayed gradually decreases in size, while space 542 where user comments 520 are displayed gradually increases in size. In particular embodiments, text block 510 (i.e., the content item) may be adjusted in order to be displayed in a space that is gradually decreasing in size.

With some implementations, text block 510 may be adjusted by cutting off lines near the bottom of text block 510 so that it requires gradually less space to display. In FIG. 6B, the bottom four lines in text block 510 have been cut off (e.g., replaced with " . . . " to indicate that some text is not displayed). As a result, the remaining lines of text block 510 can be displayed in a smaller space 541. By decreasing the size of space 541, there is more space available on the screen, which enables the size of space 542 to increase. More user comments (e.g., about five user comments) can now be displayed in space 542 at the same time.

As the user continues to scroll down the series of user comments, space 541 continues to decrease in size by cutting off more lines near the bottom of text block 510. At the same time, space 542 continues to increase in size, taking advantage of the additional space made available as space 541 decreases in size. In FIG. 6C, space 541 further decreases in size. Only three lines of text block 510 are now displayed in space 541, and the rest lines are all cut off (e.g., replaced with " . . . "). On the other hand, space 542 further increases in size. About eight user comments are now displayed in space 542 at the same time.

In particular embodiments, as the user continues to scroll down the series of user comments, space 541 where text block 510 is displayed continues to decrease in size while space 542 where user comments 520 are displayed continues to increase in size, until space 541 reaches a predefined minimum size or space 542 reaches a predefined maximum size. Thereafter, the user may continue to scroll down the series of user comments but the sizes of spaces 541 and 542 remain the same.

Suppose that a user begins to scroll up the series of user comments. After the user reaches near the top of the series, as the user continues to scroll up the series of user comments, space 541 where text block 510 is displayed gradually increases in size, while space 542 where user comments 520 are displayed gradually decreases in size. With some implementations, there may be a predefined threshold user comment. If the user scrolls up past the threshold user comment and continues to scroll up further, the sizes of space 541 and 542 begin to adjust accordingly. For example, suppose that the threshold user comment is the fifth user comment from the top of the series. As the user scrolls up the series and reaches the fifth user comment, if the user continues to scroll up the series further, the sizes of space 541 and 542 begin to adjust accordingly. In particular embodiments, text block 510 (i.e., the content item) may be adjusted in order to be displayed in a space that is gradually increasing in size.

Figures 7A, 7B, 7C:
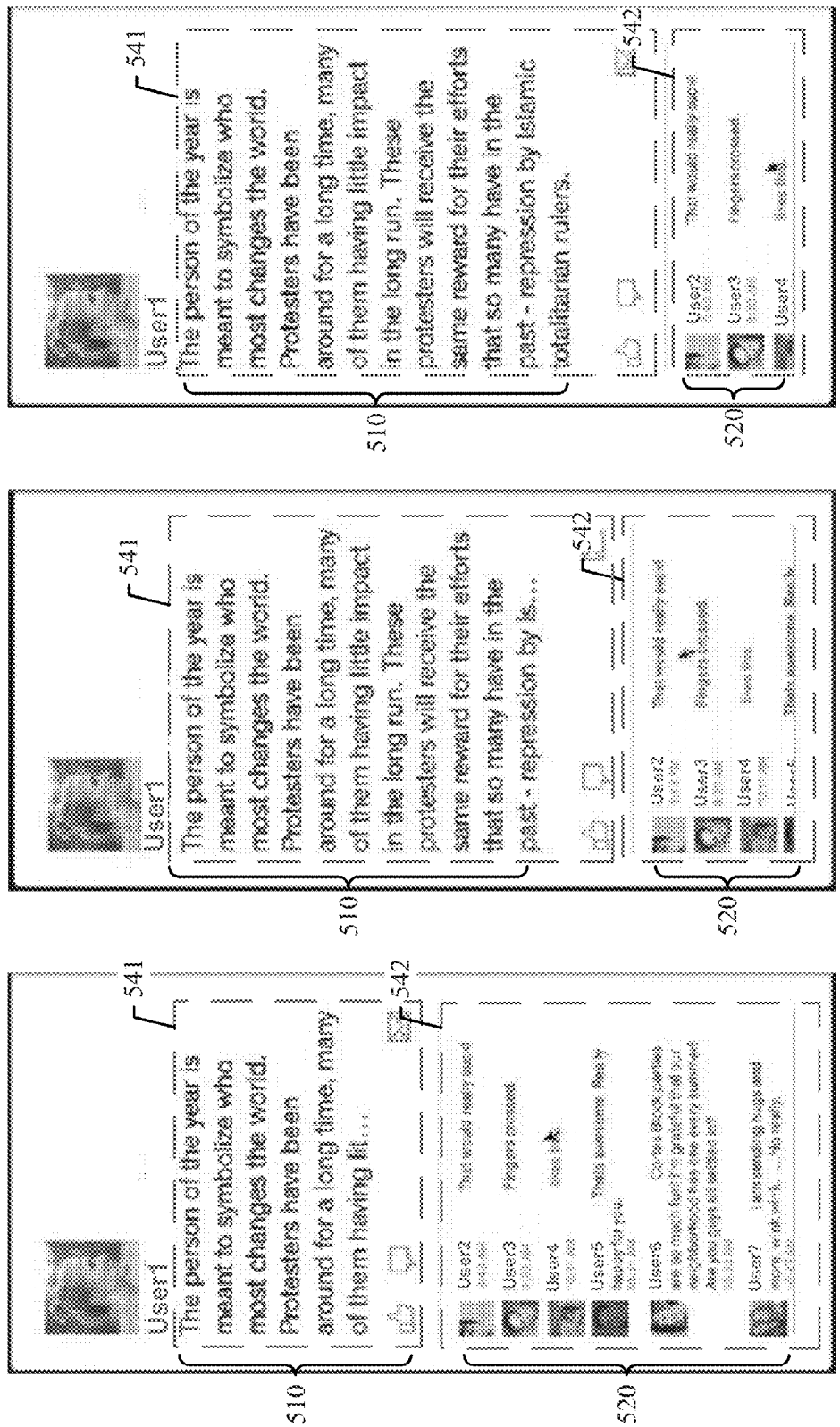
FIGS. 7A-7C illustrate an example of adjusting a content item so that less user comments are displayed at a time.

To further explain, consider an example illustrated in FIGS. 7A-7C, which is the reverse process of FIGS. 6A-6C. Suppose that from FIG. 6C, the user begins to scroll up the series of user comments and reaches near the top of the series (e.g., past the predefined threshold user comment). In FIG. 7A, as the user continues to scroll up the series of user comments, space 542 begins to gradually decrease in size, which results in some space made available on the screen. At the same time, space 541 beings to gradually increase in size, taking advantage of the newly available space on the screen. More lines of text block 510 can be displayed in space 541, whereas less number of user comments 520 are displayed in space 542 (e.g., in comparison to the case illustrated in FIG. 6C).

In FIG. 7B, the user continues to scroll up the series. In response, space 541 continues to increase in size, while space 542 continues to decrease in size. Still more lines of text block 510 are displayed in space 541 and less number of user comments 520 are displayed in space 542.

In particular embodiments, as the user continues to scroll up the series of user comments, space 541 where text block 510 is displayed continues to increase in size while space 542 where user comments 520 are displayed continues to decrease in size, until space 541 reaches a predefined maximum size or space 542 reaches a predefined minimum size. Thereafter, the user may continue to scroll up the series of user comments but the sizes of spaces 541 and 542 remain the same. In FIG. 7C, the size of space 541 has returned to its initial size (e.g., before the user begins scrolling through the series of comments, similar to FIG. 5). Text block 510 is displayed in its entirety. Similarly, the size of space 542 has also returned to initial size, and only about three user comments are displayed in space 542.

In particular embodiments, at any time while the user is scrolling up or down through the series of user comments, the user may click on text block 510. This may cause the display of text block 510 and user comments 520 to return to its initial state (e.g., as illustrated in FIG. 5).

There are different ways to adjust text block 510 while space 541 decreases or increases in size. Consider another example illustrated in FIGS. 8A-8C. Similarly to the process illustrated in FIGS. 6A-6C, as a user scrolls down a series of user comments, space 541 where text block 510 is displayed gradually decreases in size while space 542 where user comments 520 are displayed gradually increases in size accordingly, until space 541 reaches a predefine minimum size or space 542 reaches a predefines maximum size. However, in this example, text block 510 is adjusted by gradually decreasing the font size used to display the text (e.g., instead of cutting off lines near the bottom of text block 510). In FIG. 8A, text block 510 is displayed using a larger font size. In FIG. 8B, text block 510 is displayed using a somewhat smaller font size. In FIG. 8C, text block 510 is displayed using an even smaller font size. By displaying text block 510 using smaller and smaller font sizes, space 541 needed to display text block 510 becomes smaller and smaller. In other words, text block 510 can be displayed in smaller and smaller spaces 541, but still in its entirety.

FIGS. 9A-9C illustrate the reverse process of FIGS. 8A-8C. As the user scrolls up the series of user comments and reaches near the top of the series, space 541 where text block 510 is displayed gradually increases in size while space 542 where user comments 520 are displayed gradually decreases in size accordingly, until space 541 reaches a predefine maximum size or space 542 reaches a predefines minimum size. At the same time, text block 510 is displayed using increasingly larger font sizes, while increasingly fewer number of user comments 520 are displayed in space 520.

With some implementations, while space 541 decreases or increases in size, text block 510 may be adjusted using a combination of methods. Consider a third example illustrated in FIGS. 10A-10C. Similarly, as a user scrolls down a series of user comments, space 541 where text block 510 is displayed gradually decreases in size while space 542 where user comments 520 are displayed gradually increases in size accordingly, until space 541 reaches a predefine minimum size or space 542 reaches a predefines maximum size. In this example, text block 510 is adjusted by gradually decreasing the font size used to display the text and cutting off lines near the bottom of text block 510 at the same time.

A content item that receives user comments can be of any type. For example, for an image, while the space where the image content item is displayed increases or decreases in size, the image content item may be adjusted by increasing or decreasing its size accordingly. Similarly, for a video, while the space where the video content item is displayed increases or decreases in size, the video content item may be adjusted by increasing or decreasing its size accordingly.

Figure 11:
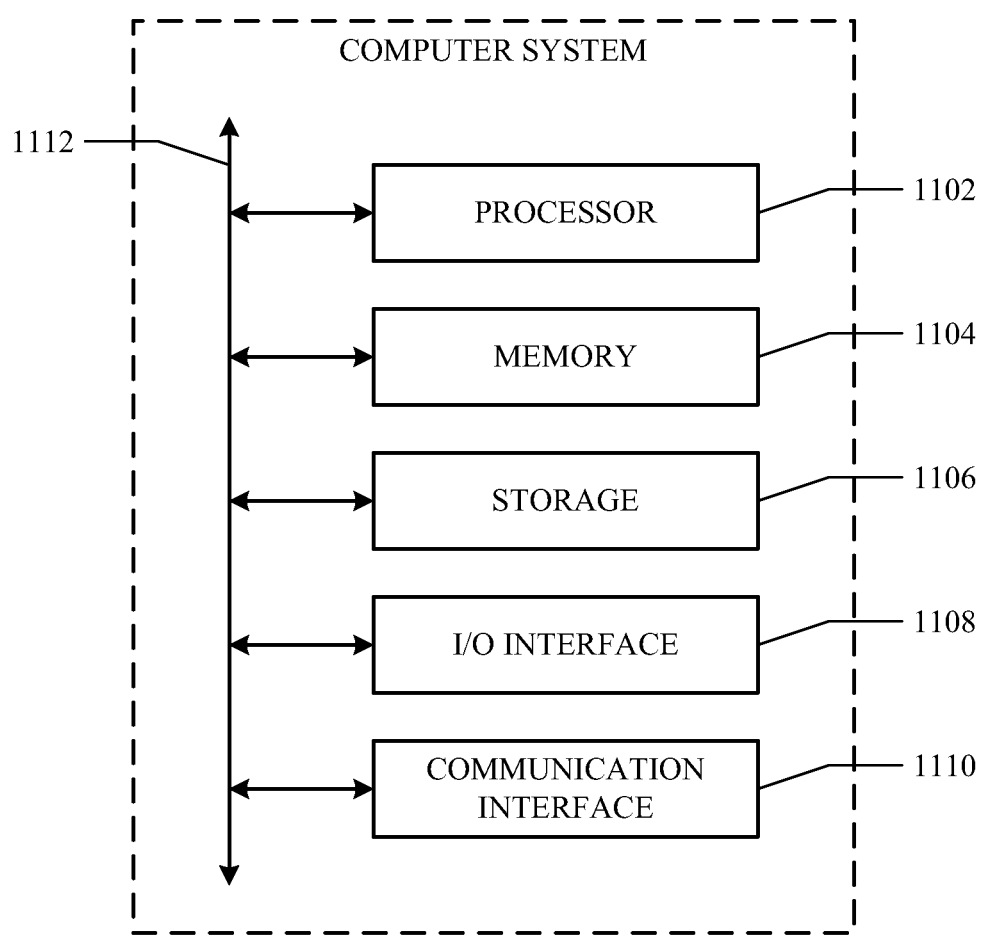
FIG. 11 illustrates an example computer system.

The process illustrated in FIGS. 6-10 may be implemented as computer software and executed on a computer system. FIG. 11 illustrates an example computer system 1100. In particular embodiments, one or more computer systems 1100 perform one or more steps of one or more methods described or illustrated herein. In particular embodiments, one or more computer systems 1100 provide functionality described or illustrated herein. In particular embodiments, software running on one or more computer systems 1100 performs one or more steps of one or more methods described or illustrated herein or provides functionality described or illustrated herein. Particular embodiments include one or more portions of one or more computer systems 1100. Herein, reference to a computer system may encompass a computing device, and vice versa, where appropriate. Moreover, reference to a computer system may encompass one or more computer systems, where appropriate.

This disclosure contemplates any suitable number of computer systems 1100. This disclosure contemplates computer system 1100 taking any suitable physical form. As example and not by way of limitation, computer system 1100 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 1100 may include one or more computer systems 1100; be unitary or distributed; span multiple locations; span multiple machines; span multiple data centers; or reside in a cloud, which may include one or more cloud components in one or more networks. Where appropriate, one or more computer systems 1100 may perform without substantial spatial or temporal limitation one or more steps of one or more methods described or illustrated herein. As an example and not by way of limitation, one or more computer systems 1100 may perform in real time or in batch mode one or more steps of one or more methods described or illustrated herein. One or more computer systems 1100 may perform at different times or at different locations one or more steps of one or more methods described or illustrated herein, where appropriate.

In particular embodiments, computer system 1100 includes a processor 1102, memory 1104, storage 1106, an input/output (I/O) interface 1108, a communication interface 1110, and a bus 1112. Although this disclosure describes and illustrates a particular computer system having a particular number of particular components in a particular arrangement, this disclosure contemplates any suitable computer system having any suitable number of any suitable components in any suitable arrangement.

In particular embodiments, processor 1102 includes hardware for executing instructions, such as those making up a computer program. As an example and not by way of limitation, to execute instructions, processor 1102 may retrieve (or fetch) the instructions from an internal register, an internal cache, memory 1104, or storage 1106; decode and execute them; and then write one or more results to an internal register, an internal cache, memory 1104, or storage 1106. In particular embodiments, processor 1102 may include one or more internal caches for data, instructions, or addresses. This disclosure contemplates processor 1102 including any suitable number of any suitable internal caches, where appropriate. As an example and not by way of limitation, processor 1102 may include one or more instruction caches, one or more data caches, and one or more translation lookaside buffers (TLBs). Instructions in the instruction caches may be copies of instructions in memory 1104 or storage 1106, and the instruction caches may speed up retrieval of those instructions by processor 1102. Data in the data caches may be copies of data in memory 1104 or storage 1106 for instructions executing at processor 1102 to operate on; the results of previous instructions executed at processor 1102 for access by subsequent instructions executing at processor 1102 or for writing to memory 1104 or storage 1106; or other suitable data. The data caches may speed up read or write operations by processor 1102. The TLBs may speed up virtual-address translation for processor 1102. In particular embodiments, processor 1102 may include one or more internal registers for data, instructions, or addresses. This disclosure contemplates processor 1102 including any suitable number of any suitable internal registers, where appropriate. Where appropriate, processor 1102 may include one or more arithmetic logic units (ALUs); be a multi-core processor; or include one or more processors 1102. Although this disclosure describes and illustrates a particular processor, this disclosure contemplates any suitable processor.

In particular embodiments, memory 1104 includes main memory for storing instructions for processor 1102 to execute or data for processor 1102 to operate on. As an example and not by way of limitation, computer system 1100 may load instructions from storage 1106 or another source (such as, for example, another computer system 1100) to memory 1104. Processor 1102 may then load the instructions from memory 1104 to an internal register or internal cache. To execute the instructions, processor 1102 may retrieve the instructions from the internal register or internal cache and decode them. During or after execution of the instructions, processor 1102 may write one or more results (which may be intermediate or final results) to the internal register or internal cache. Processor 1102 may then write one or more of those results to memory 1104. In particular embodiments, processor 1102 executes only instructions in one or more internal registers or internal caches or in memory 1104 (as opposed to storage 1106 or elsewhere) and operates only on data in one or more internal registers or internal caches or in memory 1104 (as opposed to storage 1106 or elsewhere). One or more memory buses (which may each include an address bus and a data bus) may couple processor 1102 to memory 1104. Bus 1112 may include one or more memory buses, as described below. In particular embodiments, one or more memory management units (MMUs) reside between processor 1102 and memory 1104 and facilitate accesses to memory 1104 requested by processor 1102. In particular embodiments, memory 1104 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. This disclosure contemplates any suitable RAM. Memory 1104 may include one or more memories 1104, where appropriate. Although this disclosure describes and illustrates particular memory, this disclosure contemplates any suitable memory.

In particular embodiments, storage 1106 includes mass storage for data or instructions. As an example and not by way of limitation, storage 1106 may include a hard disk drive (HDD), a floppy disk drive, flash memory, an optical disc, a magneto-optical disc, magnetic tape, or a Universal Serial Bus (USB) drive or a combination of two or more of these. Storage 1106 may include removable or non-removable (or fixed) media, where appropriate. Storage 1106 may be internal or external to computer system 1100, where appropriate. In particular embodiments, storage 1106 is non-volatile, solid-state memory. In particular embodiments, storage 1106 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 1106 taking any suitable physical form. Storage 1106 may include one or more storage control units facilitating communication between processor 1102 and storage 1106, where appropriate. Where appropriate, storage 1106 may include one or more storages 1106. Although this disclosure describes and illustrates particular storage, this disclosure contemplates any suitable storage.

In particular embodiments, I/O interface 1108 includes hardware, software, or both, providing one or more interfaces for communication between computer system 1100 and one or more I/O devices. Computer system 1100 may include one or more of these I/O devices, where appropriate. One or more of these I/O devices may enable communication between a person and computer system 1100. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 1108 for them. Where appropriate, I/O interface 1108 may include one or more device or software drivers enabling processor 1102 to drive one or more of these I/O devices. I/O interface 1108 may include one or more I/O interfaces 1108, where appropriate. Although this disclosure describes and illustrates a particular I/O interface, this disclosure contemplates any suitable I/O interface.

In particular embodiments, communication interface 1110 includes hardware, software, or both providing one or more interfaces for communication (such as, for example, packet-based communication) between computer system 1100 and one or more other computer systems 1100 or one or more networks. As an example and not by way of limitation, communication interface 1110 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 1110 for it. As an example and not by way of limitation, computer system 1100 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 1100 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 1100 may include any suitable communication interface 1110 for any of these networks, where appropriate. Communication interface 1110 may include one or more communication interfaces 1110, where appropriate. Although this disclosure describes and illustrates a particular communication interface, this disclosure contemplates any suitable communication interface.

In particular embodiments, bus 1112 includes hardware, software, or both coupling components of computer system 1100 to each other. As an example and not by way of limitation, bus 1112 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 1112 may include one or more buses 1112, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, functions, operations, or steps, any of these embodiments may include any combination or permutation of any of the components, elements, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A computer-implemented method comprising:
arranging a plurality of components of a user interface on a screen of an electronic device in a hierarchy, the hierarchy having one or more layers and each layer having at least one of the components of the user interface;
presenting a background component on a first layer of the user interface; and
displaying a plurality of content items on a second layer of the user interface that overlays the first layer, comprising:
displaying a content item of the plurality of content items at a first predetermined size, the content item comprising one or more lines of text of a first font size;
displaying a first portion of a series of comments associated with the content item at a first space adjacent to the content item on the user interface; and
in response to a user scrolling down the series of comments, and while maintaining the display of the background component on the first layer,
adjusting the content item to a second predetermined size that is smaller than the first predetermined size and adjusting the lines of text to a second font size that is smaller than the first font size so that the entirety of the second predetermined size of the content item is displayed to occupy less space on the screen of the computing device than the first predetermined size, and displaying a second portion of the series of comments at a second space larger than the first space, the second portion including more comments than the first portion.

2. The method of claim 1, further comprising in response to the user scrolling up the series of comments,
adjusting the content item to a third predetermined size so that the entirety of the third predetermined size of the content item is displayed to occupy more space on the screen of the computing device than the second predetermined size, and
displaying a third portion of the series of comments at a third space smaller than the second space, the third portion including less comments than the second portion.

3. The method of claim 2, wherein:
the content item comprises one or more lines of text;
adjusting the content item to the second predetermined size so that the entirety of the second predetermined size of the content item is displayed to occupy less space on the screen of the computing device than the first predetermined size comprises decreasing a font size used to display the one or more lines of text; and
adjusting the content item to the third predetermined size so that the entirety of the third predetermined size of the content item is displayed to occupy more space on the screen of the computing device than the second predetermined size comprises increasing the font size used to display the one or more lines of text.

4. The method of claim 2, wherein:
the content item comprises one or more lines of text;
adjusting the content item to the second predetermined size so that the entirety of the second predetermined size of the content item is displayed to occupy less space on the screen of the computing device than the first predetermined size comprises decreasing a number of lines of text displayed on the screen of the computing device; and
adjusting the content item to the third predetermined size so that the entirety of the third predetermined size of the content item is displayed to occupy more space on the screen of the computing device than the second predetermined size comprises increasing the number of lines of text displayed on the screen of the computing device.

5. The method of claim 2, wherein:
the content item comprises an image;
adjusting the content item to the second predetermined size so that the entirety of the second predetermined size of the content item is displayed to occupy less space on the screen of the computing device than the first predetermined size comprises decreasing a size of the image; and
adjusting the content item to the third predetermined size so that the entirety of the third predetermined size of the content item is displayed to occupy more space on the screen of the computing device than the second predetermined size comprises increasing the size of the image.

6. One or more computer-readable non-transitory storage media embodying software that is operable when executed to:
arrange a plurality of components of a user interface on a screen of an electronic device in a hierarchy, the hierarchy having one or more layers and each layer having at least one of the components of the user interface;
present a background component on a first layer of the user interface; and
display a plurality of content items on a second layer of the user interface that overlays the first layer, comprising:
display a content item of the plurality of content items at a first predetermined size, the content item comprising one or more lines of text of a first font size;
display a first portion of a series of comments associated with the content item at a first space adjacent to the content item on the user interface; and
in response to a user scrolling down the series of comments, and while maintaining the display of the background component on the first layer,
adjust the content item to a second predetermined size that is smaller than the first predetermined size and adjusting the lines of text to a second font size that is smaller than the first font size so that the entirety of the second predetermined size of the content item is displayed to occupy less space on the screen of the computing device than the first predetermined size, and
display a second portion of the series of comments at a second space larger than the first space, the second portion including more comments than the first portion.

7. The media of claim 6, wherein the software is further operable when executed to
in response to the user scrolling up the series of comments,
adjust the content item to a third predetermined size so that the entirety of the third predetermined size of the content item is displayed to occupy more space on the screen of the computing device than the second predetermined size, and
display a third portion of the series of comments at a third space smaller than the second space, the third portion including less comments than the second portion.

8. The media of claim 7, wherein:
the content item comprises one or more lines of text;
adjust the content item to the second predetermined size so that the entirety of the second predetermined size of the content item is displayed to occupy less space on the screen of the computing device than the first predetermined size comprises decrease a font size used to display the one or more lines of text; and
adjust the content item to the third predetermined size so that the entirety of the third predetermined size of the content item is displayed to occupy more space on the screen of the computing device than the second predetermined size comprises increase the font size used to display the one or more lines of text.

9. The media of claim 7, wherein:
the content item comprises one or more lines of text;
adjusting the content item to the second predetermined size so that the entirety of the second predetermined size of the content item is displayed to occupy less space on the screen of the computing device than the first predetermined size comprises decrease a number of lines of text displayed on the screen of the computing device; and
adjusting the content item to the third predetermined size so that the entirety of the third predetermined size of the content item is displayed to occupy more space on the screen of the computing device than the second predetermined size comprises increase the number of lines of text displayed on the screen of the computing device.

10. The media of claim 7, wherein:
the content item comprises an image;
adjust the content item to the second predetermined size so that the entirety of the second predetermined size of the content item is displayed to occupy less space on the screen of the computing device than the first predetermined size comprises decrease a size of the image; and
adjust the content item to the third predetermined size so that the entirety of the third predetermined size of the content item is displayed to occupy more space on the screen of the computing device than the second predetermined size comprises increase the size of the image.

11. A system comprising: one or more processors; and a memory coupled to the processors comprising instructions executable by the processors, the processors operable when executing the instructions to:
arrange a plurality of components of a user interface on a screen of an electronic device in a hierarchy, the hierarchy having one or more layers and each layer having at least one of the components of the user interface;
present a background component on a first layer of the user interface; and
display a plurality of content items on a second layer of the user interface that overlays the first layer, comprising:
display a content item of the plurality of content items at a first predetermined size, the content item comprising one or more lines of text of a first font size;
display a first portion of a series of comments associated with the content item at a first space adjacent to the content item on the user interface; and
in response to a user scrolling down the series of comments, and while maintaining the display of the background component on the first layer,
adjust the content item to a second predetermined size that is smaller than the first predetermined size and adjusting the lines of text to a second font size that is smaller than the first font size so that the entirety of the second predetermined size of the content item is displayed to occupy less space on the screen of the computing device than the first predetermined size, and
display a second portion of the series of comments at a second space larger than the first space, the second portion including more comments than the first portion.

12. The system of claim 11, wherein the processors are further operable when executing the instructions to
in response to the user scrolling up the series of comments,
adjust the content item to a third predetermined size so that the entirety of the third predetermined size of the content item is displayed to occupy more space on the screen of the computing device than the second predetermined size, and
display a third portion of the series of comments at a third space smaller than the second space, the third portion including less comments than the second portion.

13. The system of claim 12, wherein:
the content item comprises one or more lines of text;
adjust the content item to the second predetermined size so that the entirety of the second predetermined size of the content item is displayed to occupy less space on the screen of the computing device than the first predetermined size comprises decrease a font size used to display the one or more lines of text; and
adjust the content item to the third predetermined size so that the entirety of the third predetermined size of the content item is displayed to occupy more space on the screen of the computing device than the second predetermined size comprises increase the font size used to display the one or more lines of text.

14. The system of claim 12, wherein:
the content item comprises one or more lines of text;
adjusting the content item to the second predetermined size so that the entirety of the second predetermined size of the content item is displayed to occupy less space on the screen of the computing device than the first predetermined size comprises decrease a number of lines of text displayed on the screen of the computing device; and
adjusting the content item to the third predetermined size so that the entirety of the third predetermined size of the content item is displayed to occupy more space on the screen of the computing device than the second predetermined size comprises increase the number of lines of text displayed on the screen of the computing device.

15. The system of claim 12, wherein:
the content item comprises an image;
adjust the content item to the second predetermined size so that the entirety of the second predetermined size of the content item is displayed to occupy less space on the screen of the computing device than the first predetermined size comprises decrease a size of the image; and
adjust the content item to the third predetermined size so that the entirety of the third predetermined size of the content item is displayed to occupy more space on the screen of the computing device than the second predetermined sizecomprises increase the size of the image.

* * * * *